United States Patent
Jeong et al.

(10) Patent No.: US 9,576,240 B2
(45) Date of Patent: Feb. 21, 2017

(54) EXECUTION ALLOCATION COST ASSESSMENT FOR COMPUTING SYSTEMS AND ENVIRONMENTS INCLUDING ELASTIC COMPUTING SYSTEMS AND ENVIRONMENTS

(71) Applicant: SAMSUNG ELECTRONICS CO., LTD., Suwon, Gyeonggi-Do (KR)

(72) Inventors: Sangoh Jeong, Seoul (KR); Simon J. Gibbs, San Jose, CA (US); Xinwen Zhang, San Ramon, CA (US); Anugeetha Kunjithapatham, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 660 days.

(21) Appl. No.: 14/020,711

(22) Filed: Sep. 6, 2013

(65) Prior Publication Data
US 2014/0074763 A1     Mar. 13, 2014

Related U.S. Application Data

(63) Continuation of application No. 12/710,204, filed on Feb. 22, 2010, now Pat. No. 8,560,465, and a
(Continued)

(51) Int. Cl.
*G06N 5/02* (2006.01)
*G06F 9/50* (2006.01)

(52) U.S. Cl.
CPC .............. *G06N 5/02* (2013.01); *G06F 9/5066* (2013.01)

(58) Field of Classification Search
None
See application file for complete search history.

(56) References Cited

U.S. PATENT DOCUMENTS 5,978,583 A   11/1999  Ekanadham et al.
6,298,481 B1  10/2001  Kosaka et al.
(Continued)

FOREIGN PATENT DOCUMENTS

EP   2090983   8/2009

OTHER PUBLICATIONS

Iyengar, et al., Computational Aspects of Distributed Sensor Networks, Proceedings of the International Symposium on Parallel Architectures, Algorithms and Networks (ISPAN'02), 2002, pp. 1-8.*
(Continued)

*Primary Examiner* — Wilbert L Starks
(74) *Attorney, Agent, or Firm* — Sherman IP LLP; Kenneth L. Sherman; Hemavathy Perumal

(57) ABSTRACT

Techniques for allocating individually executable portions of executable code for execution in an Elastic computing environment are disclosed. In an Elastic computing environment, scalable and dynamic external computing resources can be used in order to effectively extend the computing capabilities beyond that which can be provided by internal computing resources of a computing system or environment. Machine learning can be used to automatically determine whether to allocate each individual portion of executable code (e.g., a Weblet) for execution to either internal computing resources of a computing system (e.g., a computing device) or external resources of an dynamically scalable computing resource (e.g., a Cloud). By way of example, status and preference data can be used to train a supervised learning mechanism to allow a computing device to automatically allocate executable code to internal and external computing resources of an Elastic computing environment.

30 Claims, 22 Drawing Sheets

Related U.S. Application Data continuation-in-part of application No. 12/559,394, filed on Sep. 14, 2009, now Pat. No. 9,052,958, and a continuation-in-part of application No. 12/609,970, filed on Oct. 30, 2009, now Pat. No. 8,239,538.

(60) Provisional application No. 61/222,654, filed on Jul. 2, 2009, provisional application No. 61/222,855, filed on Jul. 2, 2009.

(56) References Cited

U.S. PATENT DOCUMENTS

| | | | |
|---|---|---|---|
| 7,506,335 | B1 | 3/2009 | Wooff et al. |
| 7,512,965 | B1 | 3/2009 | Amdur et al. |
| 7,698,708 | B1 | 4/2010 | Lent et al. |
| 7,783,698 | B2 | 8/2010 | Jain |
| 7,788,663 | B2 | 8/2010 | Illowsky et al. |
| 7,886,021 | B2 | 2/2011 | Scheifler et al. |
| 8,103,797 | B2 | 1/2012 | Day |
| 8,196,133 | B2 | 6/2012 | Kakumani et al. |
| 8,196,175 | B2 | 6/2012 | Reed et al. |
| 8,239,538 | B2 | 8/2012 | Zhang et al. |
| 2002/0010861 | A1 | 1/2002 | Matsuyama et al. |
| 2004/0054992 | A1 | 3/2004 | Nair et al. |
| 2005/0071828 | A1 | 3/2005 | Brokenshire et al. |
| 2005/0289265 | A1 | 12/2005 | Illowsky et al. |
| 2006/0031681 | A1 | 2/2006 | Smith et al. |
| 2007/0061783 | A1 | 3/2007 | Prakash |
| 2008/0016546 | A1 | 1/2008 | Li et al. |
| 2008/0082546 | A1 | 4/2008 | Meijer et al. |
| 2009/0089078 | A1 | 4/2009 | Bursey |
| 2009/0157419 | A1 | 6/2009 | Bursey |
| 2010/0043048 | A1 | 2/2010 | Dolby et al. |
| 2010/0192211 | A1 | 7/2010 | Bono et al. |
| 2010/0223385 | A1 | 9/2010 | Gulley et al. |
| 2010/0251339 | A1 | 9/2010 | McAlister |
| 2010/0332262 | A1 | 12/2010 | Horvitz et al. |
| 2010/0332530 | A1 | 12/2010 | McKelvie et al. |

OTHER PUBLICATIONS

Boss, et al., Cloud Computing, IBM, High Performance on Demand Solutions (HiPODS), Oct. 8, 2007, pp. 1-17.*
U.S. Non-Final Office Action dated Mar. 25, 2014 from U.S. Appl. No. 12/559,394.
U.S. Notice of Allowance dated Feb. 24, 2014 from U.S. Appl. No. 13/492,772.
U.S. Notice of Allowance dated Feb. 17, 2015 from U.S. Appl. No. 12/559,394.
Right Scale, Inc., "Adaptable Automation Engine," rightscale.com, URL: http://www.rightscale.com/products/features/adaptable-automation-engine.php, downloaded on Jan. 8, 2010, 6 pages, United States.
Andre, F. et al., "Improvement of the QoS via an Adaptive and Dynamic Distribution of Applications in a Mobile Environment," SRDS-2000, Proceedings of the 19th IEEE Symposium on Reliable Distributed Systems, Oct. 16, 2000-Oct. 18, 2000, pp. 21-29, United States.
Amazon, "Amazon Elastic Compute Cloud (Amazon EC2)," Amazon Web Services, URL: http://aws.amazon.com/ec2/, downloaded on Jan. 5, 2010, 9 pages, United States.
3TERA.Com, "AppLogic—Grid Operating System for Web Applications," 3tera.com, URL: http://www.3tera.com/AppLogic/, downloaded on Jan. 8, 2010, 1 page, United States.
Barnett, A., "Time to Define "Platform as a Service" (or PaaS)," Alex Barnett Blog, posted Feb. 19, 2008, URL: http://alexbarnett.net/blog/archive/2008/02/19/time-to-define-quot-platform-as-a-service-quot-or-paas.aspx, downloaded on Jan. 8, 2010, 3 pages, United States.
Chen, G. et al., "Studying Energy Trade Offs in Offloading Computation/Compliation in Java-Enabled Mobile Devices," IEEE Transactions on Parallel and Distributed Systems, vol. 15, No. 9, Sep. 2004, pp. 795-809, United States.
Anonymous, "Cloud computing," WikiPedia—The Free Encyclopedia, URL: http://en.wikipedia.org/wiki/Cloud_computing, Downloaded on Jan. 8, 2010, 7 pages, United States.
3TERA.Com, "Dynamic Appliances," 3tera.com, URL: http://www.3tera.com/AppLogic/Dynamic-appliances.php, downloaded on Jan. 8, 2010, 2 pages, United States.
Enomaly, "Enomalism Elastic Computing Platform," xensource.com, URL: http://wiki.xensource.com/xenwiki/Enomalism, downloaded on Jan. 8, 2010, 4 pages, United States.
Hoge, P., "OnLive makes Internet video games splash," San Francisco Business Times, URL: http://sanfrancisco.bizjournals.com/sanfrancisco/stories/2009/04/06/story13.html, Apr. 3, 2009, downloaded on Jan. 5, 2010, 3 pages, United States.
RightScale.Com, "How do I set up Autoscaling?," rightscale.com, URL: http://support.rightscale.com/03-Tutorials/02-AWS/02-Website_Edition/How_do_I_set_up_Autoscaling%3f, downloaded on Jan. 8, 2010, 12 pages, United States.
Le Mouel, F. et al., "AeDen: An Adaptive Framework for Dynamic Distribution over Mobile Environments," Annales de telecommunications, vol. 57-n Nov.-Dec. 2002, 35 pages, France.
Le Mouel, F., "Bibliography on Mobile Computing, Adaptive Systems and Distributed Computing,"(mainly included in PhD Thesis Adaptive Distribution Environment for Applications in a Mobile Context), Nov. 7, 2008, URL: http://liinwww.ira.uka.de/bibliography/Distributed/mobile_computing.html, 43 pages, France.
Anonymous,"Platform as a service," WikiPedia—The Free Encyclopedia, URL:http://en.wikipedia.org/wiki/Platform_as_a_service, Downloaded on Jan. 8, 2010, 5 pages, United States.
Enomaly, Com., "Product Overview," Enomaly.com, URL: http://www.enomaly.com/Product-Overview.419.0.html, downloaded on Jan. 8, 2010, 2 pages, United States.
RightScale.Com, "RightScale Cloud Management Features," rightscale.com, URL: http://www.rightscale.com/products/features/, downloaded on Jan. 8, 2010, 4 pages, United States.
Anonymous, "Software as a service," WikiPedia—The Free Encyclopedia, URL: http://en.wikipedia.org/wiki/Software_as_a_service, Downloaded on Jan. 8, 2010, 4 pages, United States.
Zhang, X. et al., "Securing Elastic Applications on Mobile Devices for Cloud Computing," Conference on Computer and Communications Security, Proceedings of the 2009 ACM workshop on Cloud Computing Security, Chicago, Illinois, USA, pp. 127-134, United States.
Chun, B.G. et al., "Augmented Smartphone Applications Through Clone Cloud Execution," HOTOS workshop (2009), URL: http://berkeley.intel-research.net/bgchun/clonecloud-hotos09.pdf , 5 pages, United States.
Xian, C. et al., "Adaptive Computation Offloading for Energy Conservation on Battery-Power Systems," 2007 International Conference on Parallel and Distributed Systems, Dec. 5-7, 2007, Hsinchu, vol. 2, pp. 1-8, United States.
Balan, R. et al., "Tactics-Based Remote Execution for Mobile Computing", Proceedings of the 1st International Conference on Mobile Systems Applications and Services (MobiSys), San Francisco, CA May 5-8, 2003, 15 pages, United States.
Narayanan, D. et al, "Predictive Resource Management for Wearable Computing", Proceedings of the 1st International Conference on Mobile Systems Applications and Services (MobiSys), San Francisco, CA 2003, pp. 113-128, United States.
Yu, Z. et al., "Supporting Context-Aware Media Recommendations for Smart Phones", Pervasive Computing IEEE, vol. 5, Issue 3, pp. 68-75, Jul.-Sep. 2006, United States.
Anonymous, "Naive Bayes Classifier", http://en.wikipedia.org/wiki/Naive_Bayes_classifier, pp. 1-8, downloaded May 24, 2010, United Sates.
Cohen, I. et al., "Capturing, Indexing, Clustering, and Retrieving System History", 20th ACM Sympossium on Operting Systems Principles (SOSP 2005), 15 pages, United States.
Cohen, I. et al. "Correlating Instrumentation Data to System States: A Building Block for Automated Diagnosis and Control", (OSDI), Dec. 2004, pp. 1-26, United States.

(56) References Cited

OTHER PUBLICATIONS

Hasan, R. et al., "Please Permit Me: Stateless Delegated Authorization in Mashups," Computer Security Applications Conference, 2008. ACSAC 2008. Annual (2008), pp. 173-182, United States.
Austel, P. et al., "Secure Delegation for Web 2.0 and Mashups," W2SP 2008 Position Statement © 2008 IBM Corporation, United States.
Anonymous, "Principle of least privilege," Wikipedia—The free encyclopedia, Jul. 23, 2010, http://en.wikipedia.org/wiki/Principle_of_least_privilege, 4 pages, United States.
Hammer-Lahav, E. Ed., "The OAuth 1.0 Protocol," Internet Engineering Task Force (IETF), Apr. 2010, http://tools.ietf.org/pdf/rfc5849.pdf, 39 pages, United States.
International Search Report dated Mar. 3, 2010 from the International Application No. PCT/KR2009/006844 from Austrian Patent Office, pp. 1-2, Dresdner Strabe, Vienna, Austria.
Written Opinion of the International Searching Authority, dated Mar. 3, 2010 from International Application No. PCT/KR2009/006844 from Austrian Patent Office, pp. 1-5, Dresdner Strabe, Vienna, Austria.
Seydim, A.Y., "Intelligent Agents: A Data Mining Perspective", Department of Computer Science and Engineering Southern Methodist University, May 1999, pp. 1-19, United States.
Scerri, P. et al., "Are Multiagent Algorithms Relevant for Real Hardware? A Case Study of Distributed Constraint Algorithms", ACM, 2001, pp. 1-7, United States.
Notice of Allowance dated Apr. 27, 2012 from U.S. Appl. No. 12/609,970.
Notice of Allowance dated Jun. 25, 2012 from U.S. Appl. No. 12/609,970.
Office Action dated Aug. 30, 2012 from U.S. Appl. No. 12/710,204.
Office Action dated Nov. 8, 2012 for U.S. Appl. No. 13/492,772.
Office Action dated Sep. 17, 2012 from U.S. Appl. No. 12/559,394.
U.S. Final Office Action mailed Dec. 10, 2012 from U.S. Appl. No. 12/710,204.
U.S. Non-Final Office Action dated Feb. 1, 2013 from U.S. Appl. No. 12/765,775.
U.S. Final Office Action dated Apr. 11, 2013 from U.S. Appl. No. 12/559,394.
U.S. Notice of Allowance mailed Jun. 6, 2013 from U.S. Appl. No. 12/710,204.
U.S. Non-Final Office Action dated May 22, 2013 from U.S. Appl. No. 13/492,772.
U.S. Notice of Allowance dated Aug. 12, 2013 from U.S. Appl. No. 12/765,775.
U.S. Advisory Action dated Jul. 16, 2013 from U.S. Appl. No. 12/559,394.
U.S. Final Office Action dated Oct. 21, 2014 from U.S. Appl. No. 12/559,394 (SISAP072/CSL08-NW10-A).
U.S. Final Office Action dated Oct. 30, 2013 from U.S. Appl. No. 13/492,772 (SISAP091/CSL09-NW02-C).

* cited by examiner

EXECUTION ALLOCATION COST ASSESSMENT FOR COMPUTING SYSTEMS AND ENVIRONMENTS INCLUDING ELASTIC COMPUTING SYSTEMS AND ENVIRONMENTS

CROSS-REFERENCE TO RELATED APPLICATIONS

The present application is a continuation of and claims priority to U.S. patent application Ser. No. 12/710,204 filed on Feb. 22, 2010, which in turn claims priority to U.S. Provisional Patent Application No. 61/222,654 filed on Jul. 2, 2009, and U.S. Provisional Patent Application No. 61/222,855 filed on Jul. 2, 2009. U.S. patent application Ser. No. 12/710,204 is also a continuation-in-part of and claims priority to U.S. patent application Ser. No. 12/559,394 filed on Sep. 14, 2009. U.S. patent application Ser. No. 12/710, 204 is also a continuation-in-part of and claims priority to U.S. patent application Ser. No. 12/609,970 filed on Oct. 30, 2009. U.S. patent application Ser. No. 12/710,204, U.S. Provisional Patent Application No. 61/222,654, U.S. Provisional Patent Application No. 61/222,855, U.S. patent application Ser. No. 12/559,394, and U.S. patent application Ser. No. 12/609,970 are all incorporated herein by reference.

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information is stored in a computer readable medium in a binary form. More complex computing systems can store content including the computer program itself A computer program may be invariable and/or built into, for example, a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS), which provides programmers with an interface used to access these resources and services.

Today, numerous types of computing devices are available. These computing devices widely range with respect to size, cost, amount of storage and processing power. The computing devices that are available today include: expensive and powerful servers, relatively cheaper Personal Computers (PC's) and laptops, and yet less expensive microprocessors (or computer chips) provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers.

Another more recent trend is the ever increasing accessibility of the Internet and the services that can be provided via the Internet. Today, the Internet can be accessed virtually anywhere by using various computing devices. For example, mobile phones, smart phones, datacards, handheld game consoles, cellular routers, and numerous other devices can allow users to connect to the Internet from anywhere in a cellular network. Within the limitations imposed by the small screen and other limited and/or reduced facilities of a pocket-sized or handheld device, the services of the Internet, including email and web browsing, may be available. Typically, users manage information with web browsers, but other software can allow them to interface with computer networks that are connected to or by the Internet. These other programs include, for example, electronic mail, online chat, file transfer and file sharing. Today's Internet can be viewed as a vast global network of interconnected computers, enabling users to share information along multiple channels. Typically, a computer that connects to the Internet can access information from a vast array of available servers and other computers by moving information from them to the computer's local memory. The Internet is a very useful and important resource as readily evidenced by its ever increasing popularity and widening usage and applications.

The popularity of computing systems is evidenced by their ever increasing use in everyday life. Accordingly, techniques that can improve computing systems would be very useful.

SUMMARY OF THE INVENTION

Broadly speaking, the invention relates to computing systems and computing environments. More particularly, the invention pertains to techniques for allocating executable content in "Elastic" computing environments where, among other things, computing capabilities of a computing system (e.g., a computing device) can be effectively extended in a dynamic manner at runtime. In an Elastic computing environment, an Elastic computing system (e.g., a computing device) can be operable to determine, during runtime of executable computer code, whether to execute (or continue to execute) one or more portions of the executable computer code by effectively using a Dynamically Scalable Computing Resource as an external computing resource. The computing system can determine the relative extent of allocation of execution of the executable computer code between internal computing resources and the external computing resources of the Dynamically Scalable Computing Resource in a dynamic manner at runtime (e.g., during load time, after load time but before the execution time, execution time) and allocate the execution accordingly.

In accordance with one aspect of the invention, machine learning can be used to determine how to allocate executable portions of executable computer code between internal and external computing resources. An external computing resource can, for example, be a Dynamically Scalable Computing Resource (DSCR) or an Abstract Dynamically Scalable Computing Resource (ADSCR) (e.g., a Cloud). It will be appreciated that machine learning can also allow automatic allocation of individually executable portions of the executable computer code (e.g., Weblets) to internal and external computing resources. This allocation can be made at runtime. In particular, supervised machine learning is especially suitable as a more feasible form of machine learning for allocation of executable content in an Elastic computing environment. Naive Bayes classification is an example of a supervised machine learning described in greater detail below. Other examples include Support Vector Machines and Logistic Regression, and Least Square Estimation.

In accordance with one embodiment of the invention, a computing system can be operable to determine, based on machine learning, how to allocate individually executable portions of executable computer code (e.g., Weblets of a web-based application) for execution between its internal computing resources and one or more external computing resources. An external computing resource can, for example be a dynamically scalable computing resource (e.g., a cloud). The computing system may also be operable to use the machine learning to automatically allocate the plurality of executable portions of the executable computer code.

In accordance with one embodiment of the invention, a method for allocating executable code in an Elastic computing environment can be provided. The method can determine based on machine learning, how to allocate a plurality of individually executable portions of executable computer code for execution between one or more internal computing resources of a computing system and one or more external computing resources, including at least one dynamically scalable computing resource external to the computing system.

Generally, the invention can be implemented in numerous ways, including, for example, a method, an apparatus, a computer readable (and/or storable) medium, and a computing system (e.g., a computing device). A computer readable medium can, for example, include and/or store at least executable computer program code in a tangible form.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
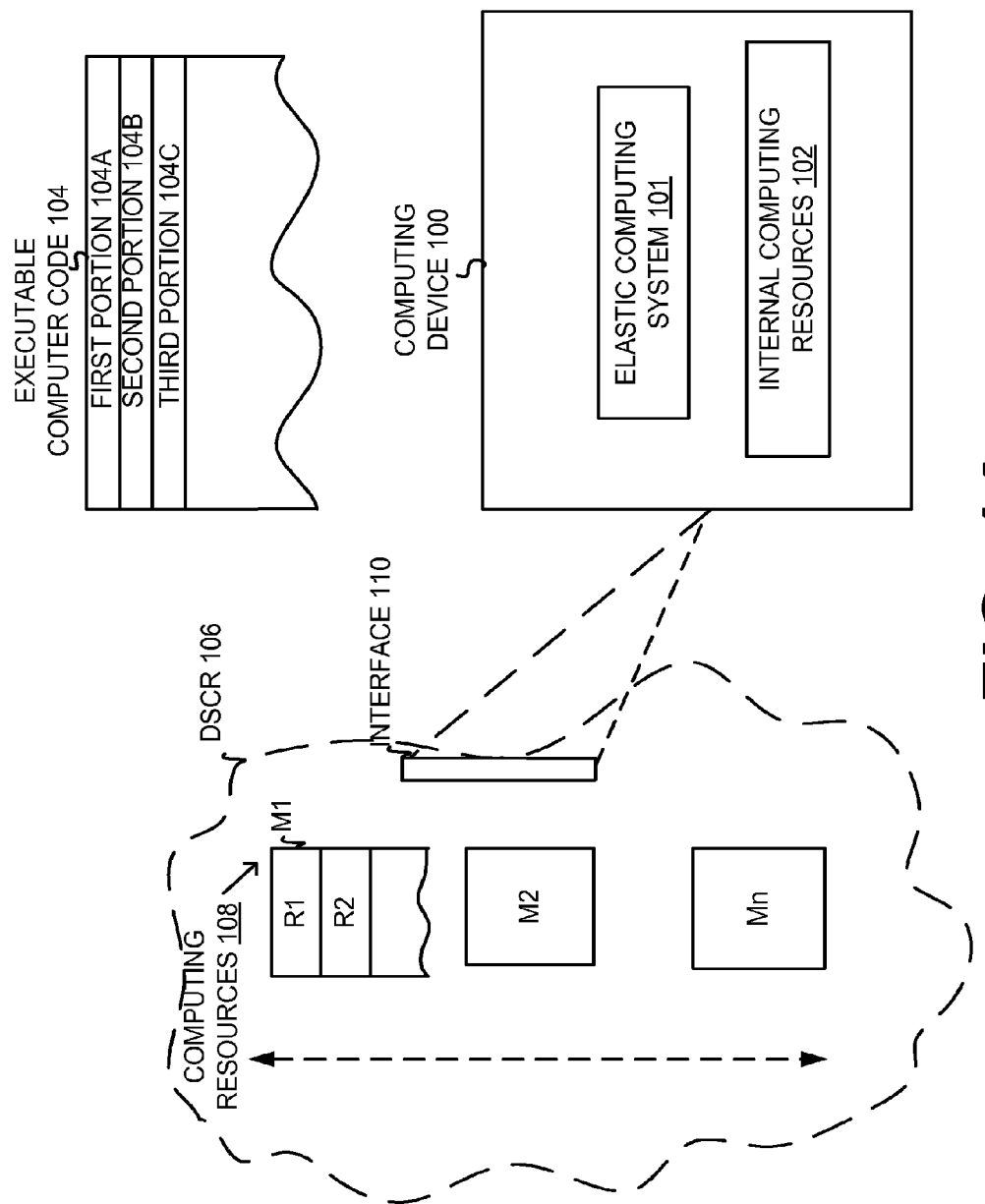
FIG. 1A depicts a computing device in accordance with one embodiment of the invention.

As noted in the background section, computing environments and systems are very useful. Today, various computing devices have become integrated in every day life. In particular, portable computing devices are extremely popular. As such, extensive efforts have been made to provide cheaper and more powerful portable computing devices. In addition, it is highly desirable to provide modern Consumer Electronic (CE) devices with extensive computing capabilities. However, conventional computing environments and techniques are not generally suitable for providing modern portable and CE computing devices. In other words, conventional computing environments provided for more traditional computing devices (e.g., Personal Computers, servers) can be relatively complex and/or expensive and not generally suitable for modern CE computing devices, especially for a CE device intended to operate with limited and/or reduced resources (e.g., processing power, memory, battery power) and/or provide other functionalities (e.g., make phone calls, function as a refrigerator). In some cases, the computing capabilities of a CE device would serve as a secondary functionality (e.g., televisions, refrigerators, etc.). As such, it is not very desirable to use a relatively complex and expensive computing environment in order to provide modern CE devices with extensive computing capabilities.

In view of the foregoing, improved computing environments are needed.

It will be appreciated that the invention provides improved computing environments and computing techniques. More particularly, the invention pertains to techniques for allocating executable content in "Elastic" computing environments where, among other things, computing capabilities of a computing system (e.g., a computing device) can be effectively extended in a dynamic manner at runtime. In an Elastic computing environment, an Elastic computing system (e.g., a computing device) can be operable to determine, during runtime of executable computer code, whether to execute (or continue to execute) one or more portions of the executable computer code by effectively using a Dynamically Scalable Computing Resource as an external computing resource. The computing system can determine the relative extent of allocation of execution of the executable computer code between internal computing resources and the external computing resources of the Dynamically Scalable Computing Resource in a dynamic manner at runtime (e.g., during load time, after load time but before the execution time, execution time) and allocate the execution accordingly.

In accordance with one aspect of the invention, machine learning can be used to determine how to allocate executable portions of executable computer code between internal and external computing resources. An external computing resource can, for example, be a Dynamically Scalable Computing Resource (DSCR) or an Abstract Dynamically Scalable Computing Resource (ADSCR) (e.g., a Cloud). It will be appreciated that machine learning can also allow automatic allocation of individually executable portions of the executable computer code (e.g., Weblets) to internal and external computing resources. This allocation can be made at runtime. In particular, supervised machine learning is especially suitable as a more feasible form of machine learning for allocation of executable content in an Elastic computing environment. Naive Bayes classification is an example of a supervised machine learning described in greater detail below. Other examples include Support Vector Machines and Logistic Regression, and Least Square Estimation.

Embodiments of these aspects of the invention are discussed below with reference to FIGS. 1A-11D. However, those skilled in the art will readily appreciate that the detailed description given herein with respect to these figures is for explanatory purposes as the invention extends beyond these limited embodiments.

FIG. 1A depicts a computing device (or computing system) 100 in accordance with one embodiment of the invention. Referring to FIG. 1A, the computing device 100 can effectively use one or more of its computing resources ("internal computing resources") 102 to perform various computing tasks, including loading and execution of executable computer code 104 (e.g., a computer application program). As will be known to those skilled in the art, the internal computing resources 102 can, for example, include one or more processors, memory, non-volatile memory, storage memory, RAM memory, a computer readable storage medium storing executable computer code, and so on. The executable computer code 104 can, for example, be stored partly or entirely by the internal computing resources 102 of the computing device 100, stored on one or more other devices including various storage devices (e.g., a Compact Disk) and/or be distributed among various entities including server computing systems (or servers) and various storage facilities. Generally, the executable computer code 104 can be stored in a computer readable storage medium provided for the computing device 100 and/or another entity. As such, the computing device 100 can be operable to store at least a first portion 104A of the executable computer code 104 internally and for execution by its internal computing resources 102.

Moreover, it will be appreciated that the computing device 100 can be operable to effectively facilitate and/or cause execution of the executable computer code 104 by a Dynamically Scalable Computing Resource (DSCR) 106 that can provide scalable computing resources on-demand and as need by the computing device 100, in a dynamic manner. As such, the computing device 100 can be operable to use the internal computing resources 102, as well as one or more (external) computing resources ("external computing resources") 108 of the DSCR 106. In other words, the computing device 100 can be operable to effectively use both internal computing resources 102 and external computing resources 108 in order to effectively facilitate, initiate, resume and/or cause execution of various portions (or parts) of the executable computer code 104 (e.g., a first and second portions 104A and 104B can be executed using respectively internal and external computing resources 102 and 106).

More particularly, the computing device 100 can effectively provide an Elastic Computing System (ESC) 101 operable to effectively extend the internal computing resources 102 by utilizing (or effectively using) the external computing resources 108 of the DSCR 106. It should be noted that DSCR 106 can effectively provide a layer of abstraction so that the ESC 101 need not specifically address a specific computing resource (e.g., a computing resource R1 of a computing device of Machine M1) or "know" the identity of a specific machine (or device) M1 that executes the second portion 104B of the executable computer code 104 on behalf of the computing device 100. As such, the DSCR 106 can be provided as an ADSCR 106, as will be appreciated by those skilled in the art. As a result, the ESC 101 can be operable to effectively use the computing resources of various entities including, for example, Machine 1 (M1) and Machine 2 (M2) of the ADSCR 106 by addressing an interface 110, whereby the computing resources 108, and/or services provided by them, can be effectively abstracted from the computing device 100.

It will also be appreciated that the ESC 101 can be operable to determine, during the runtime of the executable computer code 104, whether to execute or continue to execute one or more portions of the executable computer code 104 by effectively using the DSCR 106, thereby dynamically determining during runtime, relative extent of allocation of execution of the executable computer code 104 between the internal computing resources 102 of the computing system 100 and external computing resources 108 of the DSCR 106. Based on this determination of relative extent of allocation of execution, the ESC 101 can also be operable to effectively use the one or more external resources 108 of the DSCR 106 for execution of one or more portions of the executable computer code 104. In other words, the ESC 101 can cause the execution of one or more portions of the executable computer code 104 when it determines to execute one or more portions of the executable computer code 104 by effectively using one or more of the external resources 108 of the DSCR 106.

It should be noted that the determination of the relative extent of allocation of execution of the executable computer code 104 can, for example, occur when one or more portions of the executable computer code 104 is to be loaded for execution, one or more portions said executable computer code 104 is to be executed, one or more portions of the executable computer code 104 is being executed by one or more of the internal computing resources 102, one or more portions the executable computer code 104 is being executed by the external computing resources 108. Generally, this determination can be made during runtime when executable computer code 104 is to be loaded for execution, or is to be executed (e.g., after it has been loaded but before execution), or is being executed.

It should also be noted that determination of the relative extent of allocation of execution of the executable computer code 104 can be performed by the ESC 101, without requiring user input, thereby automatically determining the relative extent of allocation of execution of the executable computer code 104 between said one or more internal computing resources 102 and one or more external resources 108. However, it should be noted that the ESC 101 may be operable to make this determination based on one or more preferences that can, for example, be provided as set of predetermined user-defined preferences (e.g., minimize power or battery usage, use internal resources first, maximize performance, minimize monetary cost). The ESC 101 may also be operable to make the determination of the relative extent of allocation of execution of the executable computer code 104 based on input explicitly provided by a user at runtime. By way of example, the ESC 101 may be operable to request user input and/or user confirmation prior to allocation of execution to the DSCR 106.

This determination can, for example, be made based on one or more capabilities the internal computing resources 102, monetary cost associated with using the external resources 108, expected and/or expectable latency for delivering services by the external resources 108, network bandwidth for communication with the DSCR 106, status of one or more physical resources, battery power of the computing system 100, one or more environmental factors, physical location of the computing system 100, number and/or types of applications being executed on the computing system 100, type of applications to be executed.

It will be appreciated that the ESC 101 can be operable to determine the relative extent of allocation of execution of the executable computer code 104 between the internal and external computing resources 102 and 108 without requiring code developers to explicitly define the extent of the allocation. In other words, the ESC 101 can determine the extent of execution allocation to external computing resources 108 and make the allocation accordingly without requiring the executable computer code 104 to effectively provide any instructions with respect to allocation of execution between the internal and external computing resources 102 and 108. As a result, computer application developers need not develop applications that explicitly define allocation between internal and external computing resources of a computing system or a device. It should be noted that the developer can explicitly identify code portions (or code fragments) to be allocated for execution using internal and external computing resources. However, the ESC 101 can determine which of the code portions are to be executed by internal or external computing resources.

It will also be appreciated that the ESC 101 can be operable to effectively increase and/or decrease the extent of the effective use of the one or more external resources 108 of the DSCR 106 during runtime of the executable computer code 104, thereby effectively providing dynamic Elasticity to modify and/or adjust the extent of allocation of execution to execute more of less portions of the executable computer code 104 during runtime. The one or more portions of the executable computer code 104 can be relocate and/or replicable code, as will be appreciated by those skilled in the art. Moreover, the ESC 101 can be operable to effectively relocate one or more re-locatable and/or replicable code portions 104 from the computing system 100 to the DSCR 106, or vice versa, during runtime of the executable computer code 104.

In other words, the computing device 100 can be operable to vary the extent of execution allocation of the executable computer code 104, during run time, between various allocation stages. These allocation stages include: (i) an internal allocation stage when the executable computer code 104 is executed entirely and/or using only the internal computing resources 102, (ii) a split allocation stage when the executable computer code is executed using both internal and external computing resources 102 and 108, and (iii) an external allocation stage when the executable computer code 104 is executed entirely and/or using only the external computing resources 108. As such, the computing device 100 can be operable to vary the extent of execution allocation of the executable computer code 104, during run time, to provide "vertical" Elasticity between the internal computing resources 102 and the external computing resources 108 of the DSCR such that executable computer code 104 is executed using only the internal computing resources 103 or is "split" between the internal and external computing resources 102 and 108 so that at least a first executable portion 104A is executed using internal computing resources 102 and at least a second executable portion 104B is executed using the external computing resources 108.

In addition, it should be noted that the ESC 101 can be operable to cause execution of at least two portions of said executable code respectively on two nodes (e.g., machines M1 and M2) of the DSCR 106. By way of example, the ESC 101 can be operable to cause execution of at least two processes associated with the executable computer code 104 respectively on two separate computing nodes of the executable computer code 104.

In view of the foregoing, it will be apparent the ESC 101 allows the computing device 100 to effectively extend its computing capabilities beyond its internal computing capabilities effectively defined based on the capabilities of the internal computing resources 102. As such, the computing device 100 need not be bound by the limits of its internal computing capabilities but may be bound by the limits of the external computing resources of the DSCR 106 which may be relatively and/or virtually unlimited with respect to the internal computing resources 102. As a result, the computing device may be provided with very limited, reduced and/or cheap internal resources but be operable to effectively provide computing capabilities that are bound only by the virtually limitless external resources of dynamically saleable resources (e.g., a "Cloud" Computing Resources capable of providing virtually as much computing capabilities as may be desired by a single computing device).

It will also be appreciated that the ESC 101 can be operable to cause execution of the one or more portions of the executable computer code 104 by one or more external resources 108 without copying any operating environment (e.g., an operating system, an image) of the computing device 100 which is operable to execute the one or more portions of the executable computer code 104 on the computing device 100.

The ESC 101 can be operable to obtain (e.g., generate, receive) a first output data as a result of the execution of the first executable computer code portion 104A by the internal computing resources 102. In addition, the ESC 101 can be operable to obtain second output data as a result of the execution of the second portion 104B of the executable computer code 104. This means that the first and second output data associated respectively with the execution of the first and second portions (104A and 104B) can both be made available as a collective result of the executable computer code 104. As a result, the computing device 100 can provide execution output (e.g., computing services) in a similar manner as would be provided had the execution been performed using only the internal computing resources 102. It should be noted that the ESC 101 can be operable to effectively facilitate, initiate, resume and/or cause execution of one or more portions of the executable computer code 104 by using one or more external computing resources 108 of the DSCR 106, or by facilitating, initiating, resuming and/or causing the execution by the DSCR 106 (i.e., causing the DSCR to execute the executable computer code 104 using its computing resources 108). An external computing resource 108 (e.g., R1 and R2) may, for example, provide both the processing power and memory needed to execute one or more portions of the executable computer code 104, or support the execution by providing only memory or only processing power required for execution.

In general, the ESC 101 can be operable to effectively request computing services from the DSCR 106. As a dynamically scalable resource provider, the DSCR 106 can provide computing resources on demand and to the extent needed during execution time so that it can execute at least both first and second portions (104A and 104B) of the executable computer code 104. It will be appreciated that the computing resources of the DSCR 106 can far exceed the internal computing resources 102 of the computing device 100. By way of example, the computing device 100 can be a computing device with relatively limited and/or reduced computing resources 102 in comparison to a "Cloud" computing resource (106) that can provide scalable computing resources, including processing power and memory, dynamically and on demand, to the extent requested by the ESC 101 of the computing device 100.

A "Cloud" computing resource is an example of a Dynamically Scalable Computing Resource capable of providing computing services over the Internet and using typically virtualized computing resources, as will be readily known to those skilled in the art. Generally, using a dynamically scalable external resource, the ESC 101 can effectively provide a virtual device with computing capabilities far exceeding its relatively limited and/or reduced internal computing resources 102.

It should also be noted that the ESC 101 can effectively use the dynamic scalability of the DSCR 106 in order to provide a dynamically adaptable device capable of effectively providing computing services on the demand and as needed. As such, the ESC 101 can be operable to effectively switch between internal computing resources 102 and external computing resources 108 at run time during the execution of the executable computer code 104. By way of example, the ESC 101 can be operable to cause execution of a third portion 104C of the executable computer code 104 by the DSCR 106 after initiating or causing execution of the first or second portions (104A and 104B) of the executable computer code 104 and possibly while the first and/or second portions (104A and 104B) of the executable computer code 104 are being executed. As another example, the ESC 101 can be operable to execute or resume execution of the second portion 104B of the executable computer code 104 using the internal computing resources 102 after effectively initiating or causing execution of the second portion 104B of the executable computer code 104 on the DSCR 106. As yet another example, the ESC 101 can be operable to effectively facilitate, cause, or resume execution of a first portion 104A by the DSCR 106 after initiating the execution of the first portion 104A and while it is still being executed on the internal computing resource 102.

Generally, the ESC 101 can be operable to determine whether to execute at least a portion of the executable computer code 104 using an external computing resource such as the external computing resources 108 provided by the DSCR 106. Those skilled in the art will appreciate that this determination can be made based on various factors including, for example, one or more of the following: capabilities of the internal computing resources 102, the monetary cost associated with external resources, expected and/or expectable latency for delivering services, network bandwidth, status of physical resources (e.g., current battery power), environmental factors (e.g., location).

The ESC 101 can also be operable to coordinate the internal and external execution activities. By way of example, the ESC 101 can be operable to effectively coordinate execution of a first executable code portion 104A using internal computing resources 102 with the execution of a second executable code portion 104B using DSCR 106, thereby effectively using both internal and external computing resources to execute said executable computer code in a coordinated manner. As part of the coordination activities, the ESC 101 can be operable to obtain first and second output data respectively for the first and second executable code portions as a collective result, thereby making available on the ESC 101 both the first and second output data as a collective result of execution of the executable computer program code 104. It will be appreciated that the ESC 101 can provide the collective result as if the entire executable code 104 has been executed using internal computing resources 102. A user of the ESC 101 need not be aware that external computing resources are being used and computing service can be delivered in a meaningful way. In addition, ESC 101 allows development and execution of the same executable computer code (e.g., a computer Application Program) for various devices ranging from those that may have very limited and/or reduced computing resources to those with very extensive computing resources, thereby enhancing the software development process and maintenance.

In view of the foregoing, it will readily be appreciated that the computing device 100 can, for example, be a Consumer Electronic (CE) device, a mobile device, a handheld device, a home appliance device (a Television, a refrigerator) with relatively limited and/or reduced built in computing resources. Moreover, it will be appreciated that ESC 101 is especially suitable for CE and/or mobile devices with general characteristics that include limited and/or reduced computing resources and/or power, varying communication speed, quality and/or responsiveness to the user.

Figure 1B:
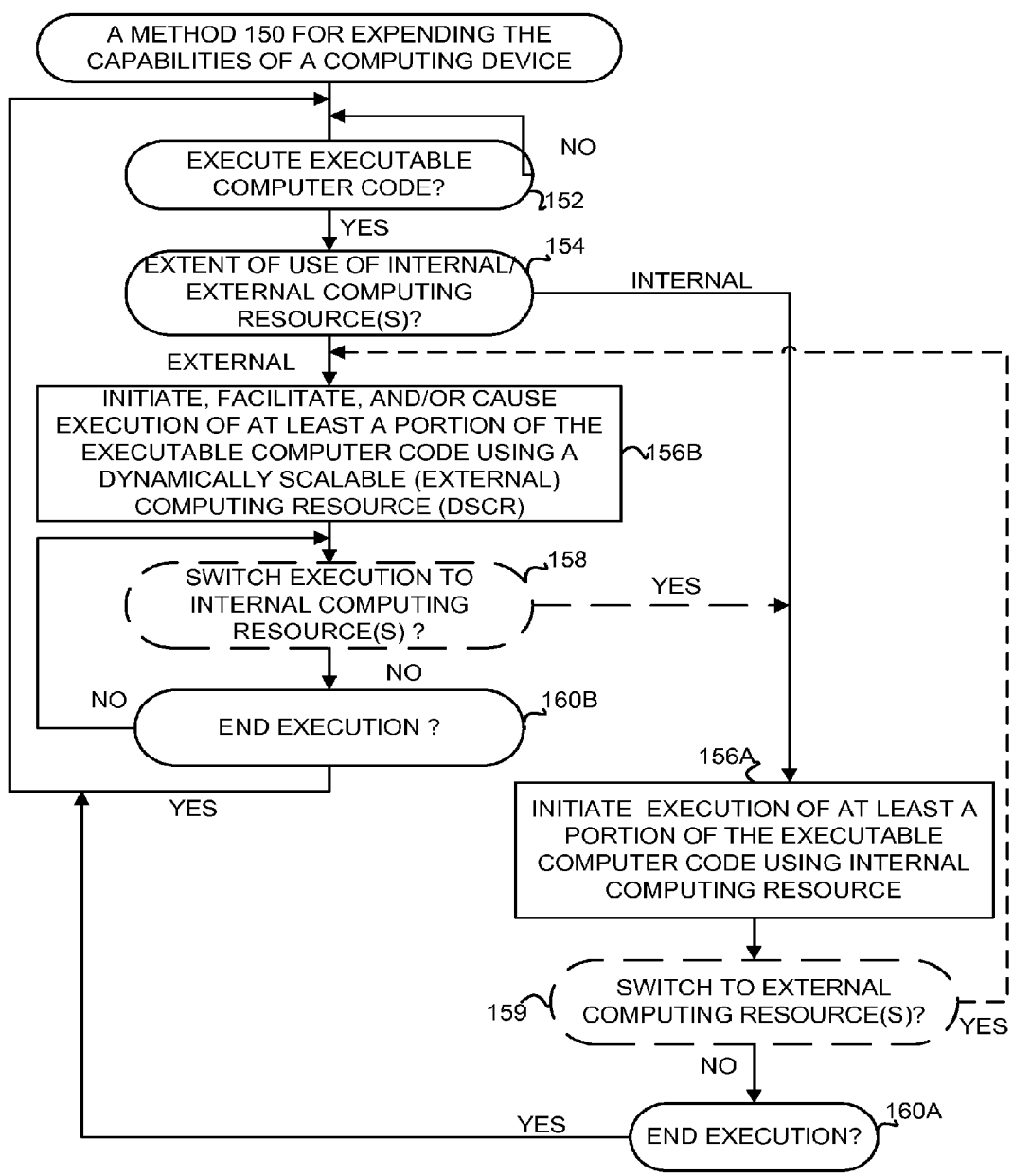
FIG. 1B depicts a method for extending (or expanding) the internal capabilities of a computing device in accordance with one embodiment of the invention.

FIG. 1B depicts a method 150 for extending the capabilities (or extending the internal capabilities) of a computing device in accordance with one embodiment of the invention. Method 150 can, for example, be performed by the computing device 100 depicted in FIG. 1A.

Referring to FIG. 1B, initially, it is determined (152) whether to execute executable computer code. In effect, the method 150 can wait until it is determined (152) that executable computer code is to be executed. If it is determined (152) to execute executable computer code, the method 150 can proceed to determine whether to use external computing resources and/or the extent of respective use of internal and external computing resources in order to execute the executable computer code. As a result, execution of at least a portion of the executable computer code can be initiated (156B) using one or more internal computing resources of the computing device (or a particular computing environment or computing system). In addition, execution of at least a portion of the executable computer code can be initiated, facilitated and/or caused (156B) using a DSCR. In other words, one or more computing resources of a DSCR can be effectively requested to be provided to the computing device as one or more external resources. Those skilled in the art will readily appreciate that generally, execution (156A and 156B) can be initiated using internal and external computing resources (156A and 156B) substantially in parallel or virtually at the same time. Furthermore, it will be appreciated that execution of various portions of the executable computer code can effectively switch between internal and external computing resources. Referring back to FIG. 1B, it can optionally be determined (158) whether to switch execution of one or more portions of executable computer code from an external computing resource, namely, a DSCR, to one or more internal computing resources. As a result, execution of a portion of the executable computer code can be initiated using an external computing resource but later moved and/or resumed using an internal computing resource. Similarly, it can optionally be determined (159) whether to switch execution of one or more portions of the executable computer code from one or more internal computing resources to one or more external computing resources and the usage of computing resources can be changed accordingly.

It should be noted that execution of executable computer code using respectively internal and external computing resources can end if it is determined to end (160A) execution using internal computing resources or end (160B) execution using external computing resources. The method 150 can proceed in a similar manner to execute executable computer code using internal and/or external computing resources while allowing usage of these resources to be adjusted during execution time in a dynamic manner, as depicted in FIG. 1B.

Figure 1C:
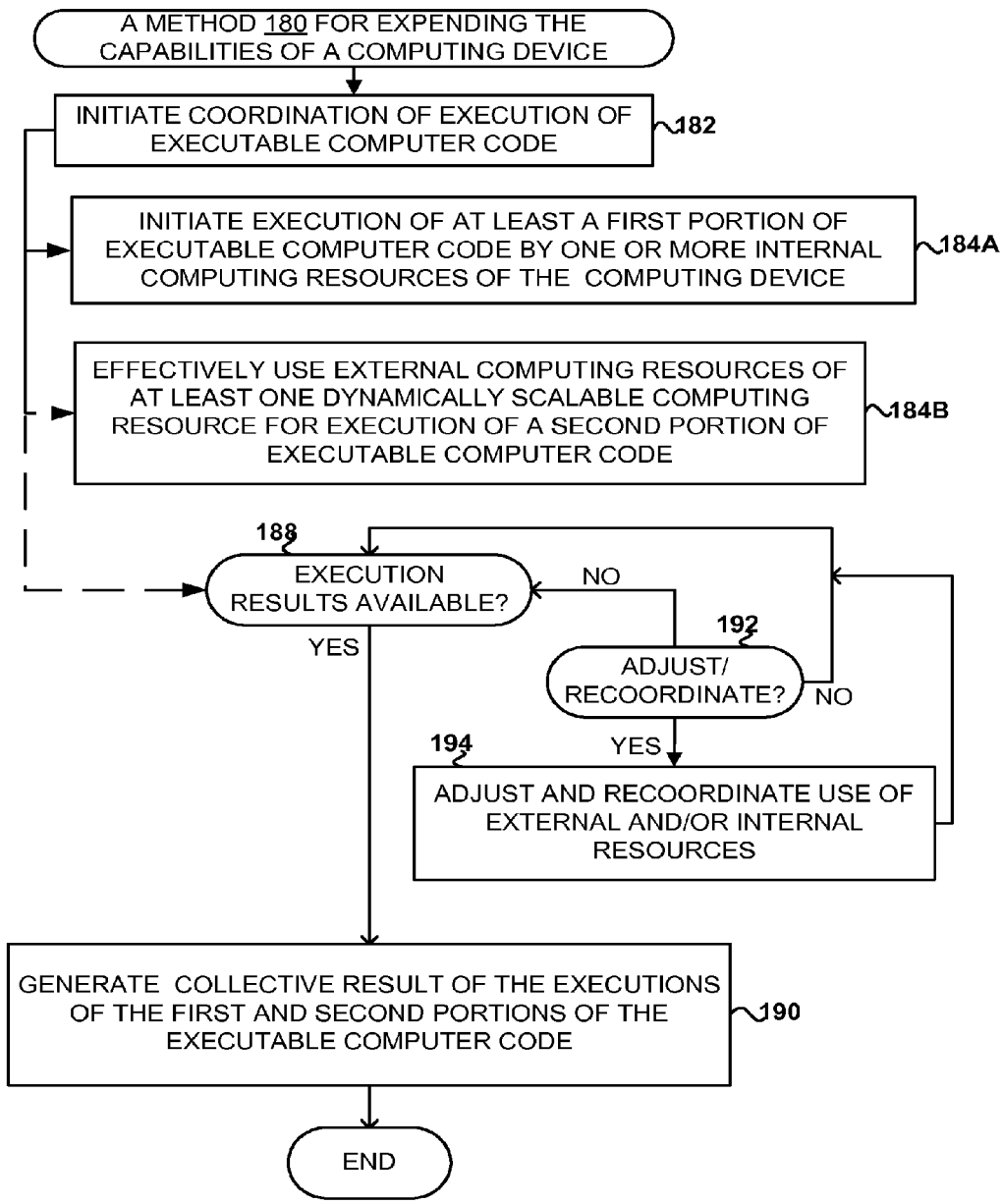
FIG. 1C depicts a method for extending (or expanding) the capabilities of a computing device in accordance with another embodiment of the invention.

FIG. 1C depicts a method 180 for extending the capabilities (or extending the internal capabilities) of a computing device in accordance with another embodiment of the invention. Method 180 can, for example, be performed by the computing device 100 depicted in FIG. 1A. Referring to FIG. 1C, initially, coordination (182) of execution of executable code is initiated. Generally, this coordination (182) can coordinate use of internal and external computing resources. In other words, coordination between use of internal and external computing resources for executing executable computer program code can be initiated. Typically, the coordination (182) coordinates: (a) execution or execution related activities using internal computing resources, and (b) execution or execution related activities using external computing resources. The internal computing resources can be provided by the computing device and external computing resources can be provided by a Dynamically Scalable Computing Resource.

Referring back FIG. 1C, two exemplary operations that can be coordinated (182) are depicted. A first operation is depicted as initiating (184A) execution of at least a first portion of executable computer code by or using one or more internal computing resources of a computing device. A second operation is depicted as effectively using (184B) external computing resources of a least one DSCR for execution of a second portion of the executable code. Those skilled in the art will readily appreciate that these exemplary operations (184A and 184B) can be initiated in various orders or in parallel.

As a part of this coordination (182), the coordination (182) can determine when to initiate each of the exemplary operations (184A and 184B), and initiate them accordingly. In effect, the coordination (182) can continue to effectively coordinate (a) execution of the first portion of executable computer code using internal computing resources with (b) execution of the second portion of executable computer code using external computing resources of a DSCR.

Those skilled in the art will appreciate that the coordination (182) can, for example, include: generating a first output for execution of the first portion of the executable computer code by using internal computing resources, and obtaining a second execution result as a result of execution of the second portion of the executable computer code by one or more external computing resources. Referring back to FIG. 1C, as a part of the coordination (182), it can be determined (188) whether the results of the executions (184A and 184B) are available. Accordingly, a collective result of the execution of the first and second portions of the code can be generated (190) as a part of the coordination (182). It should be noted that the collective result may be presented by the computing device and/or made available by the computing system.

However, if it is determined (188) that the results of the executions are not available, it can be determined (192) whether to adjust and/or re-coordinate the execution of the executable computer code. Accordingly, the execution of the executable computer can be dynamically adjusted and/or re-coordinated (194). By way of example, execution of the second code portion can be reinitiated using the same external computing resource, it can be initiated using a different external computing resource, or it can be switched to an internal resource. In addition, error handling and/or error recovery may also be performed.

Figure 1D:
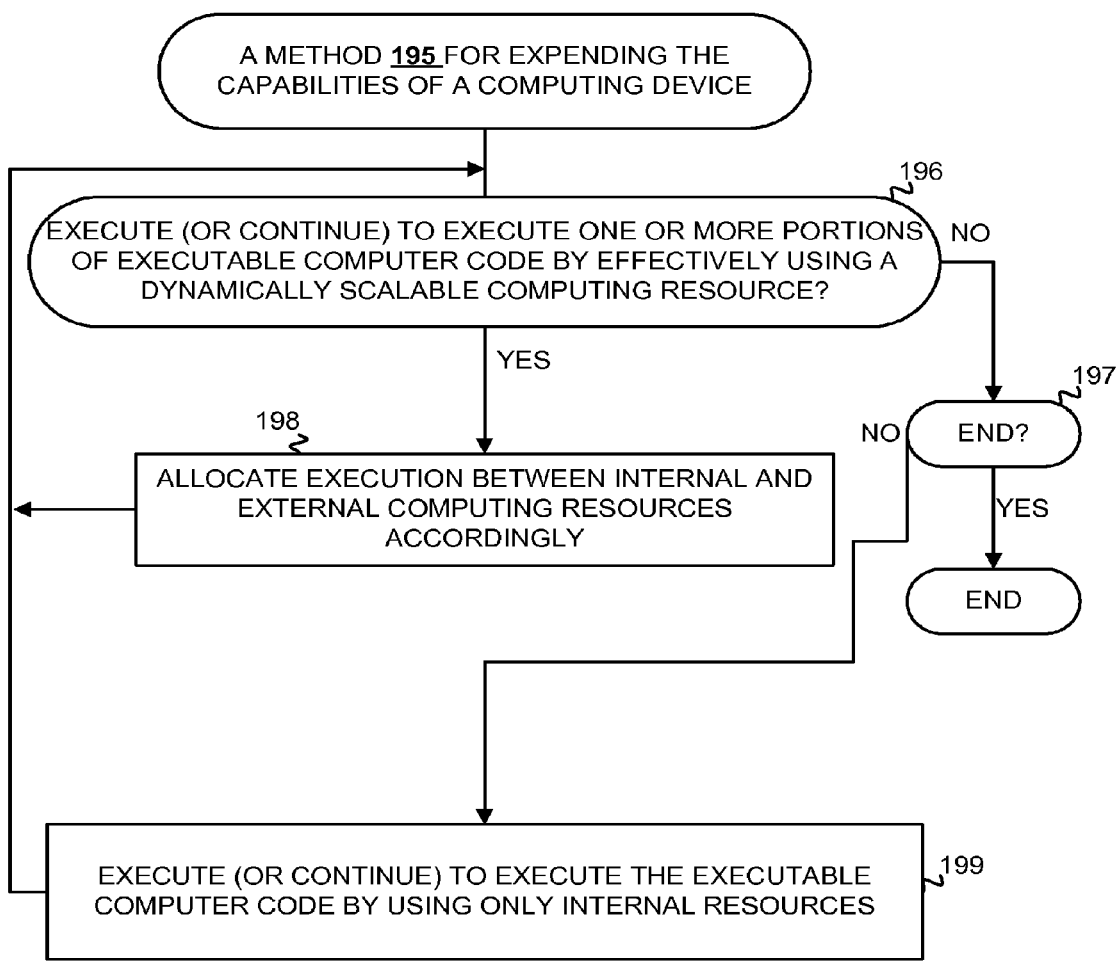
FIG. 1D depicts a method for executing executable computer code in accordance with another embodiment of the invention.

Those skilled in the art will appreciate that coordinating (182) or re-coordinating (194) can, for example, also include: determining when to effectively initiate execution of executable computer code using an internal or external computing resources, selecting a DSCR from a set of DSCR's, and selecting one or more external resources (e.g., a specific type of resource, a specific resource among other similar resources). Other examples include: determining a location for sending a request for execution of executable computer code (or a portion thereof), sending to the determined location a request for the execution of the executable computer code, and obtaining from the location the execution result FIG. 1D depicts a method 195 for execution of executable computer code in accordance with one embodiment of the invention. Method 195 can, for example, be performed by the computing device 100 depicted in FIG. 1A. Initially, it is determined (196) whether to execute or continue to execute one or more portions of executable computer code by effectively using a Dynamically Scalable Computing Resource. The determination (196) can, for example, be determined at runtime, thereby dynamically determining the relative extent of allocation of execution of the executable computer code between internal and external computing resources computing resources. If it is determined (196) not to execute or not to continue to execute at least one portion of the executable computer code, it is determined (197)

whether to end (or not initiate) execution of the executable computer code. Consequently, the method 195 can end or result in execution (199) of the executable computer code by using only internal computing resources. Thereafter, the method 195 proceeds to determine (196) whether to execute one or more portions of executable computer code by effectively using a Dynamically Scalable Computing Resource. As a result, allocation of execution may be adjusted to use external resources.

In particular, if it is determined (196) to execute or continue to execute at least one portion of the executable computer code by effectively using a Dynamically Scalable Computing Resource, the method 195 proceeds to allocate (198) execution between internal and external computing resources accordingly. After execution of the executable computer code has been allocated accordingly, method 195 proceeds to determine (196) whether to execute one or more portions of executable computer code by effectively using a Dynamically Scalable Computing Resource. In effect, the allocation of execution may be adjusted to allocate more or less of the execution of the executable computer code to the external resources. Method 195 ends if it is determined (197) to end execution of the executable computer code or if it is determined (197) not to execute the executable computer code.

As noted above, the Elastic Computing System (ESC) (e.g., ESC 101 shown in FIG. 1A) can effectively extend the internal (or physical) computing resources of a computing device, thereby extending the internal computing capabilities of the computing device. As a result, a virtual device with extensive computing capabilities can be effectively built using a device with relatively limited and/or reduced capabilities. It should be noted that the internal computing capabilities of the computing device can be extended at runtime in a dynamic manner.

Figure 2:
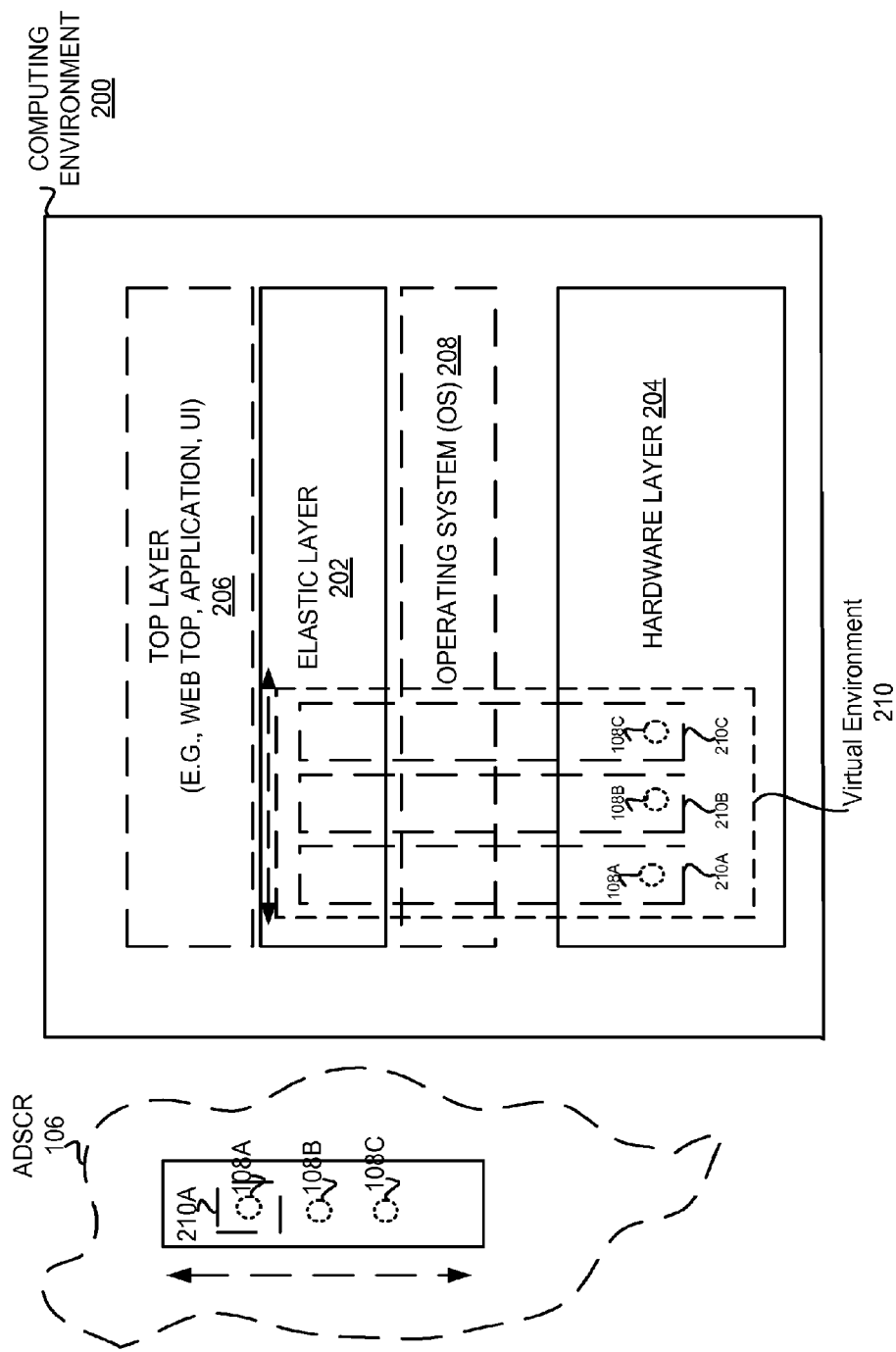
FIG. 2 depicts a computing environment in accordance with one embodiment of the invention.

To further elaborate, FIG. 2 depicts a computing environment 200 in accordance with one embodiment of the invention. The computing environment 200 can, for example, be provided by and/or for the computing device 100 depicted in FIG. 1A.

Referring to FIG. 2, an Elastic Layer (component or module) 202 can be provided for a hardware layer 204. The Elastic Layer (EL) 202 may interface with an optional top layer 206 that can, for example, include a User Interface (UI), a Web Top (WT) layer, or an application layer. As shown in FIG. 2, an optional Operating System (OS) layer 208 may also reside between the Elastic Layer (EL) 202 and the hardware layer 204, as will be appreciated by those skilled in the art. Moreover, those skilled in the art will appreciate that a Virtual Environment (VE) 210 (e.g., a Run Time Environment (RTE) 210) can be provided by the Elastic Layer (EL) 202 to effectively extend the physical hardware layer 204 and its capabilities. Referring to FIG. 2, the Elastic Layer (EL) 202 can be operable to effectively initiate and/or instantiate one or more instances of a VE 210 on demand and as needed. For example, an individual RTE instance 210A can be initiated for execution of a particular part or portion of executable computer code (e.g., an application component, an Applet, a Weblet). The Elastic Layer (EL) 202 can be operable to effectively initiate or cause initiation of a virtual computing environment by the ADSCR 106.

In effect, a computing resource 108A of the ADSCR 106 can be provided by an RTE instance 210A as if the physical computing resource 108A is present in the hardware layer 204. The RTE 210 allows effectively extending the resource 108A to the Computing Environment 200. Those skilled in the art will appreciate that the RTE can, for example, be provided to a virtual computing environment on the ADSCR 106 and/or the computing environment 200. The Elastic Layer (EL) 202 can initiate RTE instances 210 as needed and consequently be provided with the computing resources of the ADSCR 106 on demand and in a dynamic manner at runtime (or during the execution of executable computer code). As a result, the Elastic Layer (EL) 202 can effectively provide a virtual computing device capable of providing computing capabilities that can be extended dynamically and on demand far beyond the real capabilities of the hardware layer 204.

As noted above, a "Cloud" computing resource is an example of a Dynamically Scalable Computing Resource capable of providing computing services over the Internet using typically virtualized computing resources. It will be appreciated that the invention is especially suited for Web-based (or Web-centric) applications using "Cloud" computing technology.

Figure 3:
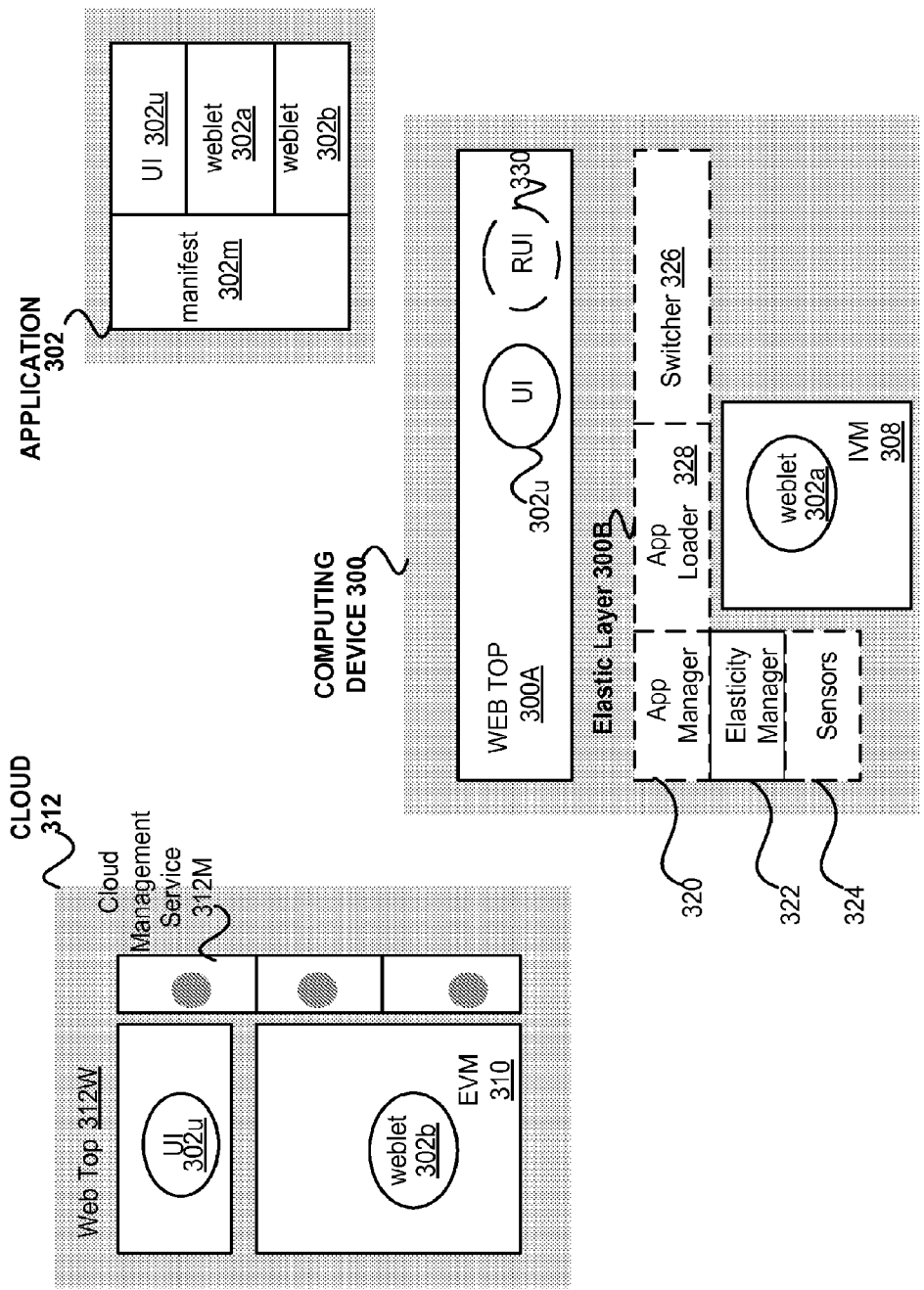
FIG. 3 depicts a computing device in a Web-based environment in accordance with one exemplary embodiment of the invention.

To further elaborate, FIG. 3 depicts a computing device 300 in a Web-based environment in accordance with one exemplary embodiment of the invention. Referring to FIG. 3, a Web-based application 302 can include a manifest 302m, a User Interface (UI) 302u, and a plurality of other application components 302a and 302b, as generally known in the art. Those skilled in the art will appreciate that as components of a Web-based application, components 302a and 302b can perform operations including, for example: responding to Hypertext Transfer Protocol (HTTP) requests, communicating with a single client and having a lifecycle bound to that of the client, executing locally or remotely. The components of a Web-based application (e.g., Web-based application 302) are referred to herein as "Weblets" (e.g., Weblets 302a and 302b). The manifest 302m can effectively provide a description of the web-based application 302. As such, the manifest 302m can, for example, provide information including the number of Weblets, format of Weblet requests, etc. Each of the Weblets 302a and 302b can be a part of an application and effectively encapsulate date state and the operations that can change the date state. A Weblet 302a can include executable code, for example, in the form of "bytecodes" that effectively expose an HTTP Interface to the User Interface, as will be readily known to those skilled in the art.

Those skilled in the art will also know that the computing device 300 can effectively provide a Web Top layer 300A (or component) effectively providing an environment for rendering and executing (or running) User Interface (UI) components, such as, the User Interface (UI) 302u of the web-based application 302. UI component 302u can, for example, be a browser, as generally known in the art.

Referring back to FIG. 3, the computing device 300 also includes an Elastic Layer (EL) 300B that may provide a number of components (or sub-components). In particular, an Application Manager (AM) 320 can be operable to initiate, or cause initiation of, one or more Virtual Computing Environments (VCEs), as one or more Internal Virtual Machines (IVMs) 308 in the computing device 300, and/or as one or more External Virtual Machines (EVM) 310 in a "Cloud" computing resource (or a "Cloud") 312. Each one of the IVM 308 and EVM 310 can effectively support the execution of a Weblet of the Web-based application 302. By way of example, the IVM 308 can effectively support the execution of the Weblet 302a when or while the EVM 310 effectively supports the execution of the Weblet 302b. Those skilled in the art will readily appreciate that these VCEs can, for example, be provided as an Application Virtual Machine, such as, a Java Virtual Machine (JVM), a Common Language Runtime (CLR), a Low Level Virtual Machine (LLVM), and others including those that an provide a complete operating system environment. The Application Manager (AM) 320 can manage an application and/or the execution of the application as a whole. As such, the Application Manager (AM) 320 can effectively serve as a higher level layer that communicates with a lower layer effectively provided by an Elasticity Manager (EM) 322 component operable to manage the individual Weblets.

In addition, the Application Manager (AM) 320 component of the Elastic Layer (EL) 300B can be operable to determine whether to initiate a VCE internally as an IVM 308, or cause initiation of a VCE externally as an EVM 310 on the "Cloud" 312. In other words, the Application Manager (AM) 320 component can be operable to determine whether to execute a particular Weblet (e.g., Weblet 302a, Weblet 302b) using the internal computing resources of the computing device 300 or external computing resources of the "Cloud" 312 which are dynamically scalable and can be provided on demand. The Application Manager (AM) 320 can be operable to make this determination based on the information provided by an Elasticity Manager (EM) 322. Generally, the Elasticity Manager (EM) 322 can be operable to monitor the environment of the computing device 300, including the computing environment of the computing device 300, and provide monitoring data to the Application Manager (AM) 320. The Elasticity Manager (EM) 322 component can, for example, monitor the environment (e.g., computing environment) of the computing device 300 based on data provided by sensors 324. Based on the data provided by the sensor and/or obtained from other sources, it can be determined whether to use of more of less of the external resources of the "Cloud" 312. As such, the Application Manager (AM) 320 may effectively initiate more EVMs on the "Cloud" 312 in order to, for example, move the execution of the Weblet 302a to the "Cloud" 312 and/or additionally execute a third Weblet of the Web-based application 302 (not shown) on an EVM of the "Cloud" 312.

It should be noted that a switcher component 326 can effectively connect the Weblets (or execution of the Weblets) 302a and 302b to the User Interface (UI) 302u regardless of whether the execution is supported entirely by the internal computing resources of the computing device 300, or the execution is supported at least partly by the external computing resources of the "Cloud" 312.

It should be noted that the "Cloud" 312 may have a Cloud Management Service (CMS) 312M that effectively manages services provided to various clients of the "Cloud" 312, including the computing device 300. More particularly, Elasticity Manager (EM) 322 can effectively interface with the CMS 312M in order to manage or co-manage one or more EVMs 310 provided by the "Cloud" 312 on behalf of computing device 300. In other words, the Elasticity Manager (EM) 322 can also be operable to serve as an interface to the "Cloud" 312 and manage and/or co-mange the computing environments of the "Cloud" 312 that pertain to the computing device 300.

In addition, the "Cloud" 312 may include other components. As shown in FIG. 3, "Cloud" 312 can provide a Web Top Environment 312W operable to effectively render and execute the User Interface (UI) 302u of the Web-based application 302. Moreover, the Elasticity Manager (EM) 322 may effectively request that the Application Manager (AM) 320 initiate the execution of the User Interface (UI) 302u by the "Cloud" 312. As a result, the User Interface (UI) 302u may be effectively rendered and executed in the Web Top Environment 312W of the "Cloud" 312. In that case, a Remote User Interface (RUI) 330 can be operable to communicate with the User Interface (UI) 302u being rendered and executed by the "Cloud" 312. The Remote User Interface (RUI) 330 may, for example, communicate user input data to the "Cloud" 312 and receive as output relatively simple instructions, such as, update display, and so on. As such, the Remote User Interface (RUI) 330 may be provided as a "thin client" or a "lightweight" User Interface while the UI logic is essentially performed by the "Cloud" 312.

It should be noted that the computing device 300 can include additional components. Referring to FIG. 3, an application loader 328 can be operable to load various components of the Web-based application 302 in a similar manner as a conventional application loader operates.

Moreover, it should be noted that the computing device 300 can be operable to dynamically adjust its usage of the external computing resources (or services) provided by the "Cloud" 312 at runtime when one or more of the Web-based application 302 are being executed. As such, the computing device 300 can behave as a dynamically adjustable (or Elastic) device. To further demonstrate the dynamic adaptability (or Elasticity) of the computing device 300, FIGS. 4A, 4B, 4C and 4D depict various configurations of a dynamically adjustable (or Elastic) computing device 300 in accordance with a number of embodiments of the invention.

Figure 4A:
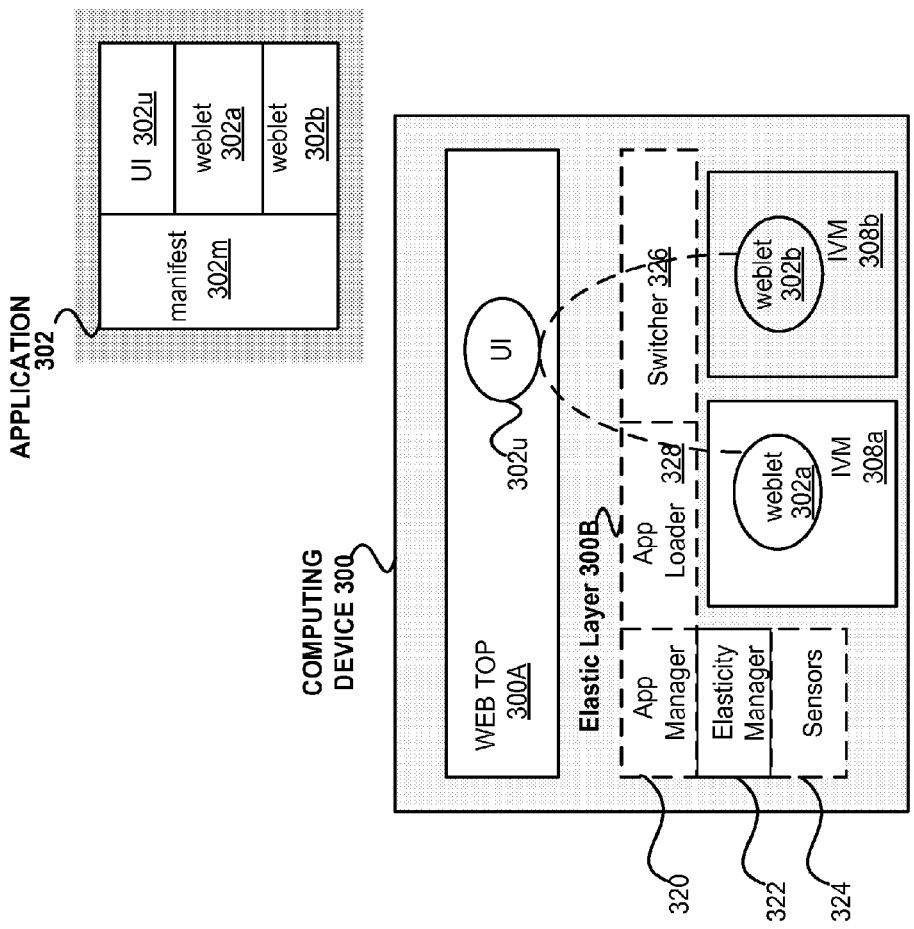
FIGS. 4A, 4B, 4C and 4D depict various configurations of a dynamically adjustable (or Elastic) computing device in accordance with a number of embodiments of the invention.
Figure 4B:
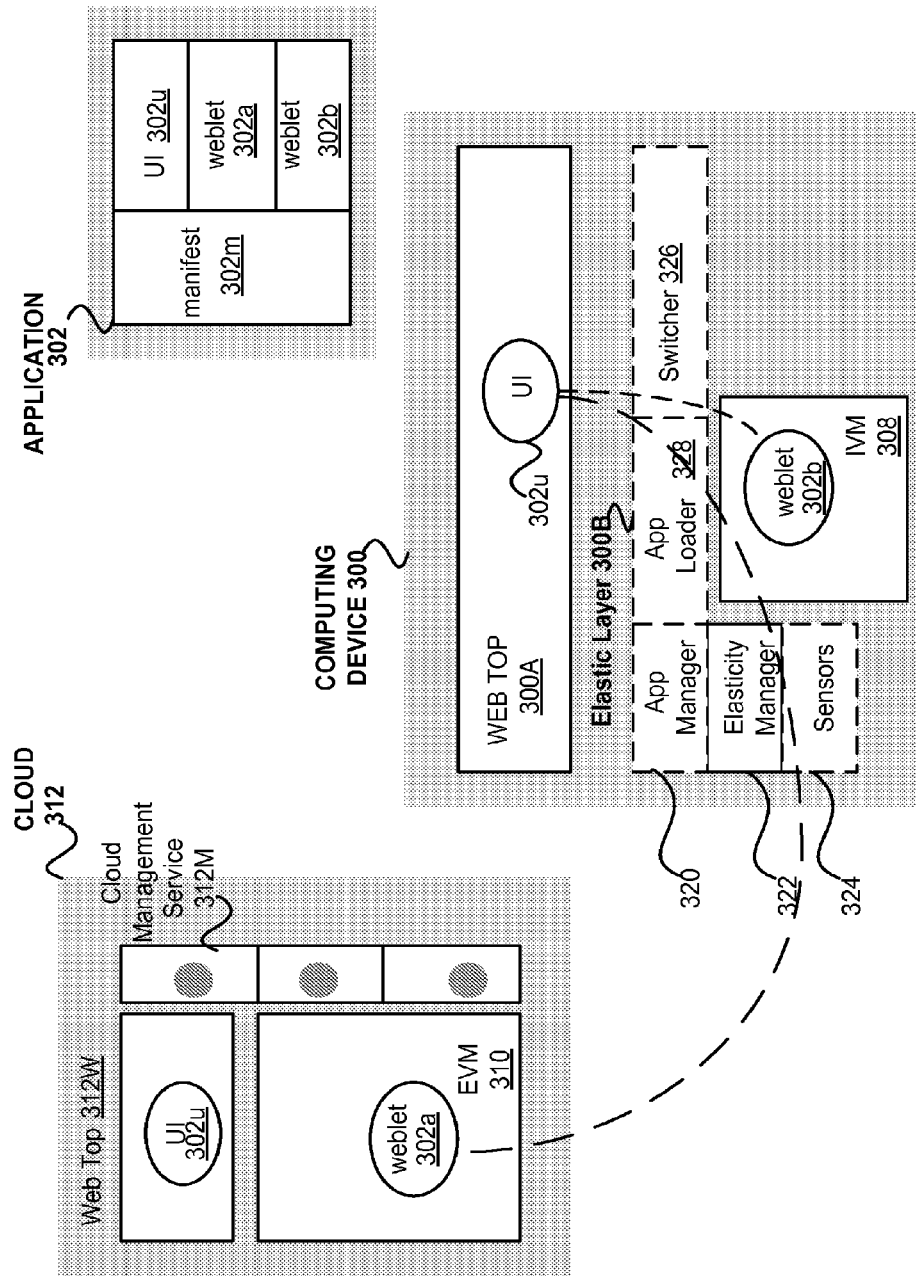
Figure 4C:
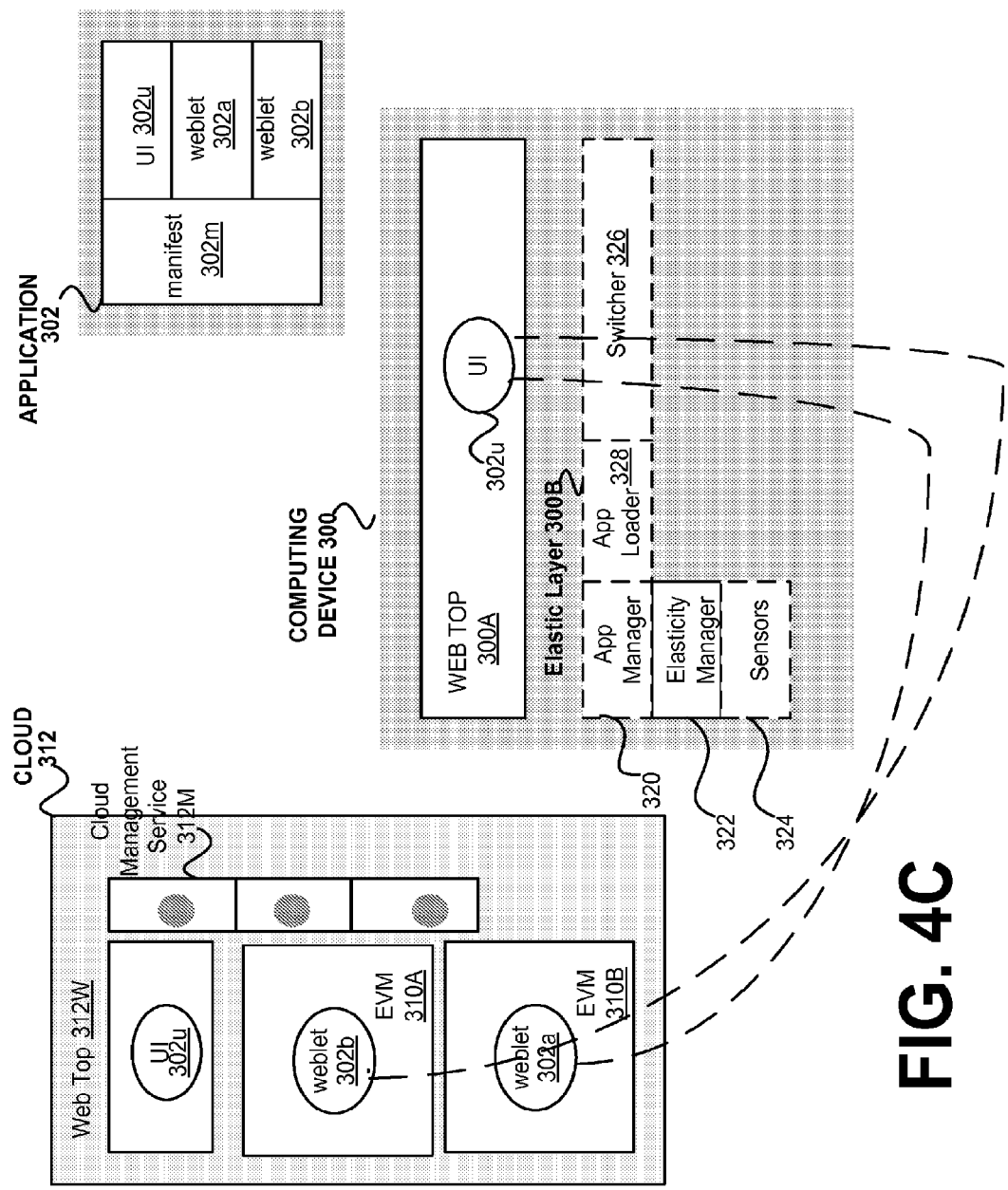
Figure 4D:
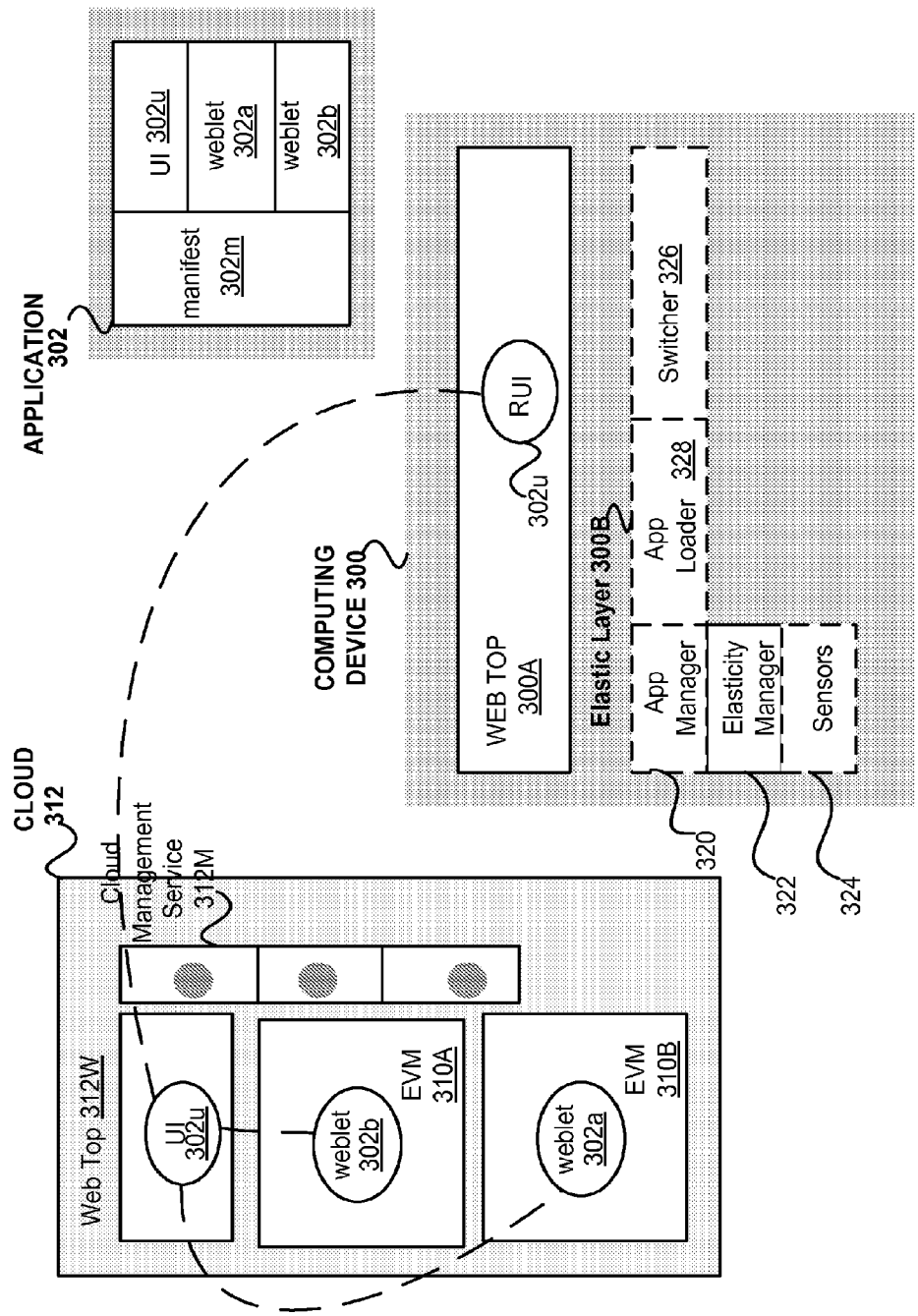

Referring to FIG. 4A, the computing device 300 (also shown in FIG. 3) may initially execute both Weblets 302a and 302b and execute and render the UI 302u using its own internal computing resources. However, if the internal computing resources are needed for other tasks, or other factors dictate preservation of the internal computing resources, the computing device 300 may use the services or the external computing resources of a "Cloud" 312, as shown in FIG. 4B. The factors that may dictate preservation of the internal computing resources can, for example, include the location of the computing device 300, the battery power, monetary cost associated with obtaining external computing services, network bandwidth available for obtaining external computing services, and so on. Referring now to FIG. 4B, execution of the Weblet 302a can be supported by the "Cloud" 312 instead of the computing device 300 while Weblet 302b and UI 302u are still executed using the internal computing resources of the computing device 300. Those skilled in the art will readily appreciated that the execution of the Weblet 302a can be effectively moved to the "Cloud" 312 by, for example, requesting its execution from "Cloud" 312 or effectively initiating its execution on "Cloud" 312. As a dynamically Elastic device, the computing device 300 may still use more of the computing resources of the "Cloud" 312 during execution or run time. As shown in FIG. 4C, Weblet 302a and 302b can both be executed by the "Cloud" 312 while only the UI 302u is executed using the internal computing resources of the computing device 300. Subsequently, the execution of the UI 302u can even be effectively moved to the "Cloud" 312, as depicted in FIG. 4D. By way of example, the execution of the UI 302u can be requested from "Cloud" 312 or effectively initiated on Cloud" 312 in order to effectively move the execution of UI 302u to "Cloud" 312.

Those skilled in the art will appreciate that Cloud Computing (CC) can, among other things, deliver infrastructure-as-a-service (IaaS), platform-as-a-service (PaaS), and software-as-a-service (SaaS). As a result, computing models for service providers and individual consumers that enable new IT business models, such as, for example, "resource-on-demand", pay-as-you-go, and utility-computing. In the case of consumer electronic (CE) devices, applications are traditionally constrained by limited and/or reduce resources, such as, for example, low CPU frequency, smaller memory, low network bandwidth, and battery powered computing environment. Cloud computing can be used to effectively remove the traditional constraints imposed on CE devices. Various "Elastic" devices, including CE devices can be augmented with cloud-based functionality.

Figure 5:
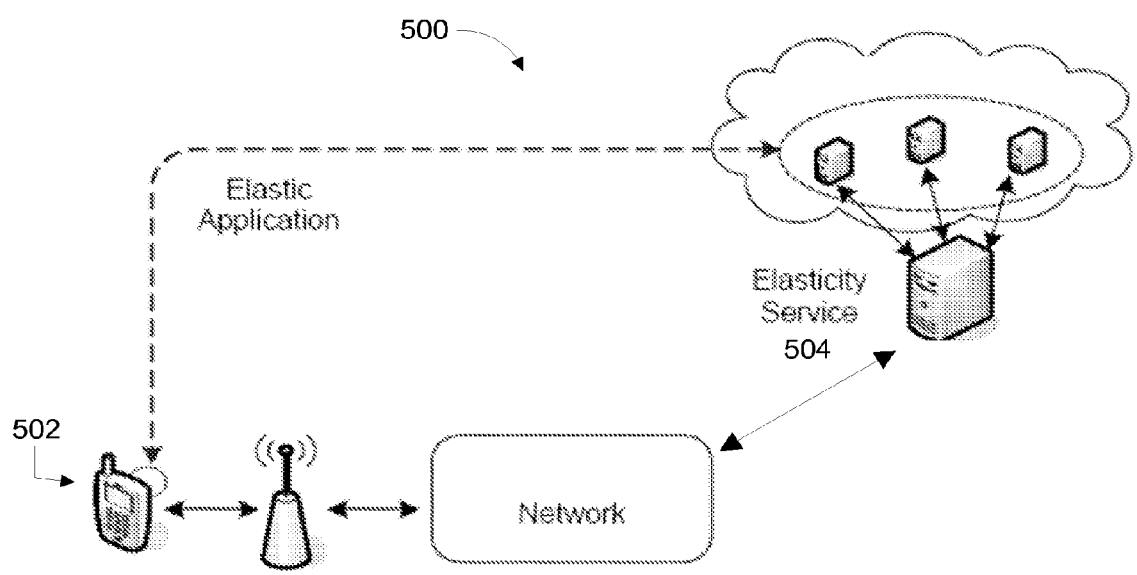
FIG. 5 depicts an Elastic mobile device (or mobile terminal) operable to effectively consume cloud resources via an Elasticity service in a computing/communication environment in accordance with one embodiment of the invention.

FIG. 5 depicts an Elastic mobile device (or mobile terminal) 502 operable to effectively consume cloud resources via an Elasticity service 504 in a computing/communication environment 500 in accordance with one embodiment of the invention. In the computing/communication environment 500, an Elastic application can include of one or more Weblets that can function independently, but can communicate with each other. When an Elastic application is launched, an Elastic manager on the mobile device 502 (not shown) can monitor the resource requirements of the Weblets of the application, and make decisions as to where the Weblets can and/or should be launched. By way of example, computation and/or communication extensive Weblets, such as image and video processing, usually strain the processors of mobile devices. As such, an Elastic manager can determine to launch computation and/or communication extensive Weblets on one or more platforms in the cloud. On the other hand, User Interface (UI) components requiring extensive access to local data of the mobile device 502 may be launched by the Elastic manager on the mobile device 502. When a Weblet is to be launched on the cloud, the Elastic manager can be operable to communicate with the Elasticity service 504 residing on the cloud. The Elasticity service 504, among other things, can be operable to make decisions regarding the execution of one or more Weblet on the cloud. By way of example, the Elasticity service 504 can determine on which cloud node a Weblet can and/or should be launched, and how much storage can and/or should be allocated for the execution of the Weblet on the cloud. The Elasticity service can also be operable to return information back to the mobile device 502 after successfully launching the Weblet (e.g., return an endpoint URL). In some situations, even with heavy computational tasks, execution on the device may be preferred and/or only possible. For example, when the mobile device 502 is unable to communicate with the Elasticity service 504 (e.g., mobile device 502 is offline, media items to be executed are small in size or number, or fast response is not a requirement. In general, the mobile device 502 and the Elasticity service 504 can "work together" to decide where and how various tasks can and/or should be executed. The Elasticity service 504 can be operable to organize cloud resources and delegate various application requirements of multiple mobile devices including the mobile device 502. As a service provider, the Elasticity service 504 may or may not be part of a cloud provider.

Furthermore, the Elastic manager can be operable to make decisions regarding migrating Weblets during run time (e.g., when Weblets are being executed) between the device 502 and the cloud, based in various criteria, for example, including changes in the computing environment of the device 502 or changes in user preferences. It should be noted that the Weblets of an application can be operable to communicate with each other during execution to exchange various information to, for example, synchronize the application state and exchange input/output data. As will be appreciated by those skilled in the art, communication between the Weblets of the same application can, for example, be accomplished by a Remote Procedure Call (RPC) mechanism or using "REST-ful" web services. The Elasticity service 504 can organize cloud resources and delegates application requirements from various mobile devices including the mobile device 502. As a service provider, the Elasticity service 504 may or may not be part of a cloud provider.

Those skilled in the art will readily appreciate that the mobile device 502 can, for example, represent an example of a computing device 300 depicted in FIG. 4, and the Elastic Service 504 can, for example, represent a Cloud Management Service 312 also depicted in FIG. 4.

It will also be appreciated that the computing/communication environment, among other things, allows development of applications (Elastic applications) that can even better leverage cloud computing for mobile devices that have traditionally been resource constrained. The general concepts and benefits of Elastic applications are disclosed in U.S. Provisional Patent Application No. 61/222,855, entitled "SECURING ELASTIC APPLICATIONS ON MOBILE DEVICES FOR CLOUD COMPUTING," filed Jul. 2, 2009, which is hereby incorporated by reference herein for all purposes, and, among other things, provides an Elastic framework architecture, and Elastic application model, a security model for Elastic applications and Elastic computing/communication environment.

In view of the foregoing, it will also be appreciated that the techniques described above, among other things, allow splitting an application program into sub-components (e.g., Weblets spilt between an Elastic device and a Cloud computing resource). This approach dramatically differs from conventional approaches including those that primarily focus on providing resources (e.g., Information Technology (IT) resources provided to them to enterprise IT infrastructures), traditional clienVserver model where computation can be initially and statically requested from a service provider (e.g., a server), whereby most, if not all, of the computation is done by the service provider. In stark contrast, the invention allows computation to be done based on application components (e.g., individual Weblets) and allows each application component to be executed by a different entity and in a different location. As such, the invention allows an application model that need not distinguish between clients and servers, but can distinguish between individual components of a single application. The invention also provides device or client based techniques and solutions that have not been addressed by conventional approaches, which have been primarily focused on providing resources from the perspective of a resource or service provider. Again, it should be noted that the techniques of the inventions are especially and highly suited for mobile devices that have been traditionally constrained by limited computing capabilities due to their limited and/or reduced computing resources. Conventional techniques do not provide a practical and feasible solution allowing mobile devices to effectively split execution of applications between in a dynamic manner, thereby allowing execution of an application to be split during runtime in a manner deemed more appropriate at a given time, and yet split differently later but still during the runtime of the same application Execution Allocation Cost Assessment In view of the foregoing, it will readily be appreciated that in an Elastic Computing Environment (ECE), various executable code components or modules (e.g., a computer application program) can be effectively split between aCE device and one or more computing resource providers (e.g., a cloud providing one or more platforms and/or services). For example, some parts or components of a computer application program (or application) can be executed (or run) on a device while others parts or components can be executed on a Cloud. This would effectively extend the computing capabilities of the device and can overcome its resource constraints. Also, applications life cycle can be extended since the same application can be used on various devices regardless of their resource constraints.

Those skilled in the art will know that primitive operations enabling an Elastic application model, for example, include data and code offloading when the application is loaded, dynamic migration during runtime, creating new components (or component instances) for execution, destroying active components, and changing/adjusting the load balance between active components during runtime.

One general problem or challenge for enabling an effective Elastic application model is identification of benefits and an effective strategy/configuration for execution applications between a computing system and one or more computing resource providers. For example, one specific problem is saving power, especially for battery power of a mobile device. As such, when offloading a computing component from a device to a Cloud, the cost of power usage associated with offloading the computing component and providing data necessary for its execution can be considered to achieve a more effective Elastic application model for mobile devices. In addition, cost of power usage associated with communication between the device and the Cloud to provide input and receive output, etc. can be considered.

This problem can be expressed as finding an optimal set of Weblets to run remotely (Weblet_r) and a set of Weblets to run locally (Weblet 1), such that the Right Hand Side (RHS) of a simplified expression (shown below) is minimized or is at least less than the power cost when all Weblets run locally. That is:

$P(\text{all\_Weblets}) \geq P(\text{Weblets\_}l) + P(\text{comm}(\text{Weblet\_}l, \text{Weblet\_}r)) + P(\text{data offloading})$, and $\text{Min}((\text{Weblets\_}l) + P(\text{comm}(\text{Weblet\_}l, \text{Weblet\_}r)) + P(\text{data offloading}))$, Where:
P(all_Weblets): power cost when all Weblets are running in local
P(Weblets_1): power cost when only Weblet_1 are running local
P(comm(Weblet_1, Weblet_r): power cost for communication between Weblet_r and Weblet_1
P(data offloading): power cost for data offloading when doing the lifecycle of the app It should be noted that the exemplary problem of power consumption can require a dynamic solution for various reasons including: data offloading can be very dynamic and application specific, even with the same application a different solution may be required depending on the situation as, for example, input and/or output data associated with each instance of execution may vary for the same application. Also, such decisions may be even more complicated if the factors associated with power model or power consumption are not static. It should also be noted that the decision making itself typically consumes power, especially if a very complex/dynamic power model is used.

The same considerations can be made for other numerous execution allocation cost (or "cost") objectives including, for example, performance (e.g., latency, throughput), monetary cost (e.g., monetary costs associated with computing costs and data traffic on a Cloud charged based on a business model), and security (e.g., whether to execute private applications and/or data on a Cloud).

It will be appreciated that an execution-allocation cost assessment component (or a cost service provider) can be operable to make decisions regarding costs associated with allocation of computer executable components on or between various computing systems (e.g., computing devices, mobile phones) and computing resource providers (e.g., clouds). Generally, a cost service provider can be operable to effectively reduce or minimize cost associated with allocation of executable components based on a cost model. It should be noted that a cost service provider can be operable to make decisions regarding the allocation cost of the executable components during runtime of the executable components. Furthermore, the service provider can effectively make decisions and affect execution allocation in "real" time in a manner that would be more particular and desirable for users.

It will also be appreciated that a cost service provider can be provided that is especially suitable for Elastic computing environments that support Elastic Devices noted above and described in greater detail in U.S. patent application Ser. No. 12/559,394 entitled "EXTENDING THE CAPABILITY OF COMPUTING DEVICES BY USING DYNAMICALLY SCALABLE EXTERNAL RESOURCES," filed on Sep. 14, 2009.

Figure 6:
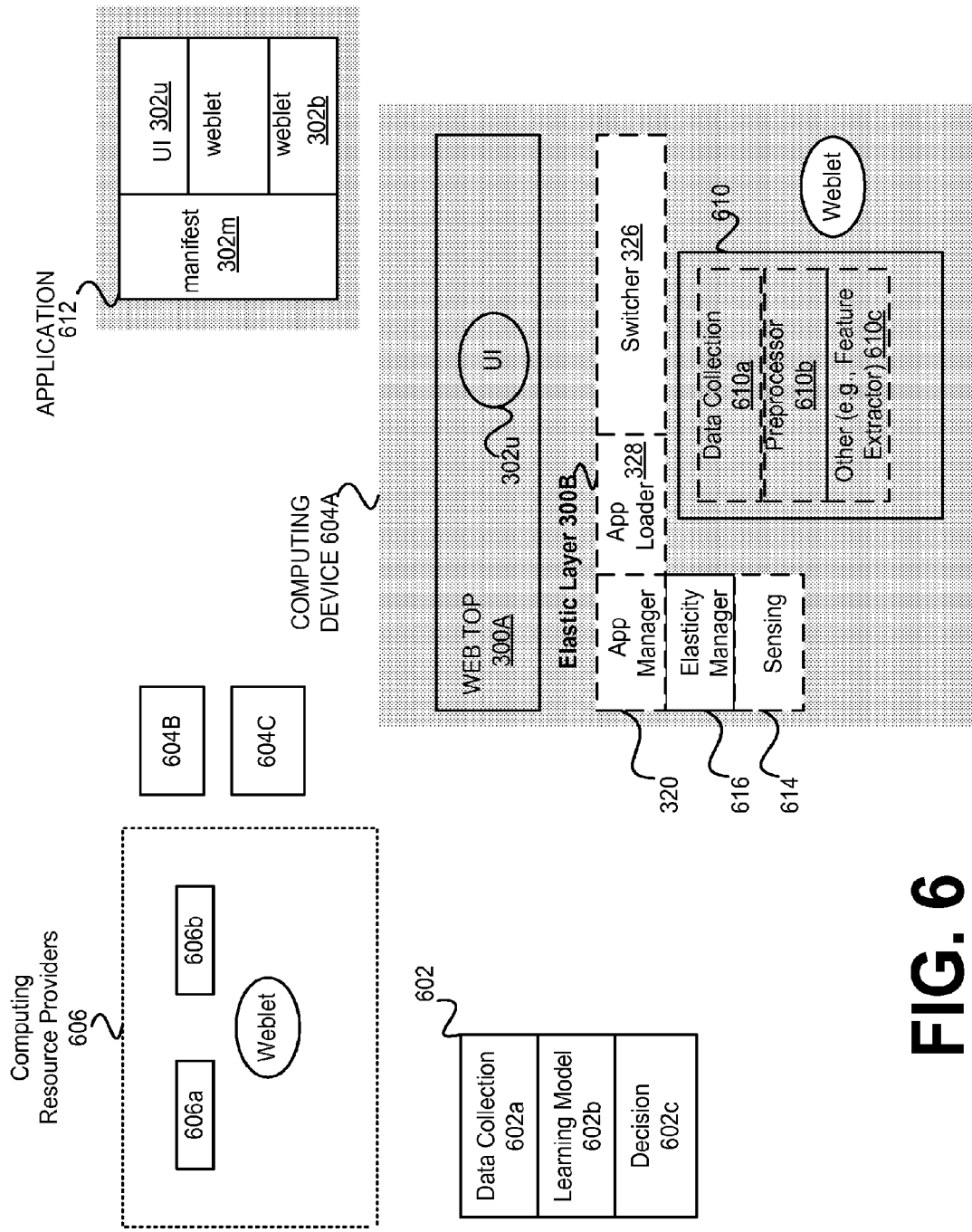
FIG. 6 depicts an Elastic computing environment in accordance with one embodiment of the invention.

To further elaborate, FIG. 6 depicts an Elastic computing environment 600 in accordance with one embodiment of the invention. Referring to FIG. 6, an execution-allocation cost service component 602 is operable to determine the relative cost associated with allocating execution of executable computer code (or executable code) to or between a computing system 604 and one or more computing resource providers 606 (e.g., one or more Clouds). Those skilled in the art will readily appreciate that the execution-allocation cost service component 602 can be provided as, or as a part of, a computing system (e.g., a computing device, a server) and may operate as a part of, in cooperation with a computing resource provider, or may be provided as, or as part of, an independent computing system that may or may not use the resources of a computing resource provider 606 in order to perform various computing or computing related tasks in order to effectively provide a execution-allocation cost service to the computing systems 604 and/or and one or more computing resource providers 606.

Referring to FIG. 6, a cost modeling agent 610 is operable on an Elastic Device 604A. Cost modeling agent 610 can include a data (or raw data) collection subcomponent (or module) 610a operable to effectively collect execution allocation data that can be obtained and effectively used by the execution-allocation cost service component (or cost service provider) 602 to make decisions regarding the allocation of an application 612 for execution between the Elastic Device 604A and the computing resource provider 606. As shown in FIG. 6, the cost modeling agent 610 can optionally include additional subcomponent including a pre-processing subcomponent 610b operable to preprocess data to provide it in a form that may be more efficient for processing by the computing resource provider 606 (e.g., convert raw data to normalized data, as generally known in the art). Other exemplary subcomponent(s) 610c can provide various functions pertaining to execution allocation data and allocation of execution based on the execution allocation data. For example, a feature extraction 610c subcomponent can be operable to determine features of patterns of the collected data in order to allow making better decisions regarding execution allocation, as will be appreciated by those skilled in the art. Referring back to FIG. 6, it should be noted that a sensing component 614 can be operable to measure and/or collect data from various sensors (not shown) of the device 604A. The data measured and/or collected by the sensing component 614 can be provided by an Elasticity manager 616 as execution allocation data to the allocation cost service component 602.

Generally, the cost modeling agent 610 can be operable to measure and/or collect data associated with the Elastic Device 604A and various application environments (e.g., application environment of the application 612). By way of example, the cost modeling agent 610 can be operable to measure and/or collect: device configuration data (e.g., data pertaining to CPU, memory, networks, bandwidth, power consumption), device sensor information (e.g., battery status, location, signal strength, temperature, speed), application runtime information (e.g., input/output data, communication data, local execution time).

Optionally, the cost modeling agent 610 can be operable to preprocess data (or raw data). By way of example, data collected in diverse forms can be converted to numerical values before feature extraction operations are performed and learning/modeling processes are applied. Also, due to differing scales and ranges of numerical values associated with different sources, normalization can be applied to various ranges of values for feature extraction and learning/modeling processes. If possible, data features, or patterns can be extracted.

The execution-allocation cost service component (or cost service provider) 602 can include a data collection subcomponent (or module) 602a, a learning and modeling subcomponent 602b (e.g., a learning and modeling engine), and a decision making subcomponent 602c, as will be appreciated by those skilled in the art. Data collection subcomponent 602a can be operable to measure and/or collect data pertaining to computing resource providers 606 (e.g., Cloud sensor data can, for example, include network status, status of shared resources, status of external data). In addition, data collection subcomponent 602a can be operable to collect data and in particular, execution allocation data, from various cost model agents including the cost model agent 610 of the Elastic Device 604A. Learning and modeling subcomponent 602b can be operable to effectively learn and model application behavior based on the data collected by the data collection subcomponent 602a. By way of example, various algorithms can be developed from simple rule-based algorithms including supervised learning algorithms, such as Support Vector Machines, and unsupervised learning algorithms, such as K-means (or Vector Quantization). In addition, the learning and modeling subcomponent 602b can be operable to run various algorithms based on the data collected and/or measured and one or more cost models. Generally, the decision making subcomponent 602c can be operable to make decisions regarding the allocation of execution between an Elastic Device 604A and computing resource providers 606. Decision making subcomponent 602c can also be operable to generate action requests to various Elasticity (or Elastic) Managers of Elastic Devices (e.g., Elasticity Manager 616 on the Elastic Device 604A). In addition, the decision making subcomponent 602c may be operable to perform various other operations to affect allocation of execution including, for example, offloading components to a computing resource provider 606 (e.g., a Cloud platform 606), create or remove components in or from an Elastic Device 604A and/or computing resource provider 606, perform task dispatch and/or allocation between executable components, upgrade or downgrade quality of service provided by the cost service provider component 602 to a particular Elastic Device including the Elastic Device 604A.

It should be noted that Elasticity Manager 616 can be operable to receive decisions (or allocation decisions) from the decision making subcomponent 602c directly or via the cost service provider 602, as requests or commands, and effectively enforce them on the Elastic Device 604A.

It should be noted that the decision making subcomponent 602c can be operable to determine a current extent of execution-allocation, based on execution-allocation data pertaining to multiple other computing devices. As such, the decision making subcomponent 602c can be operable to predict the current extent of execution-allocation based on aggregate allocation data that it can obtain and maintain. As noted above, for example, a learning model can be utilized to make predictions with respect to execution-allocation for a particular device and/or particular application, based on data (or historical data) that can be collected and maintained for the device, a particular application, multiple and typically numerous other devices and/or applications, that are likely to behave in a similar manner as the particular device or application.

Figure 7A:
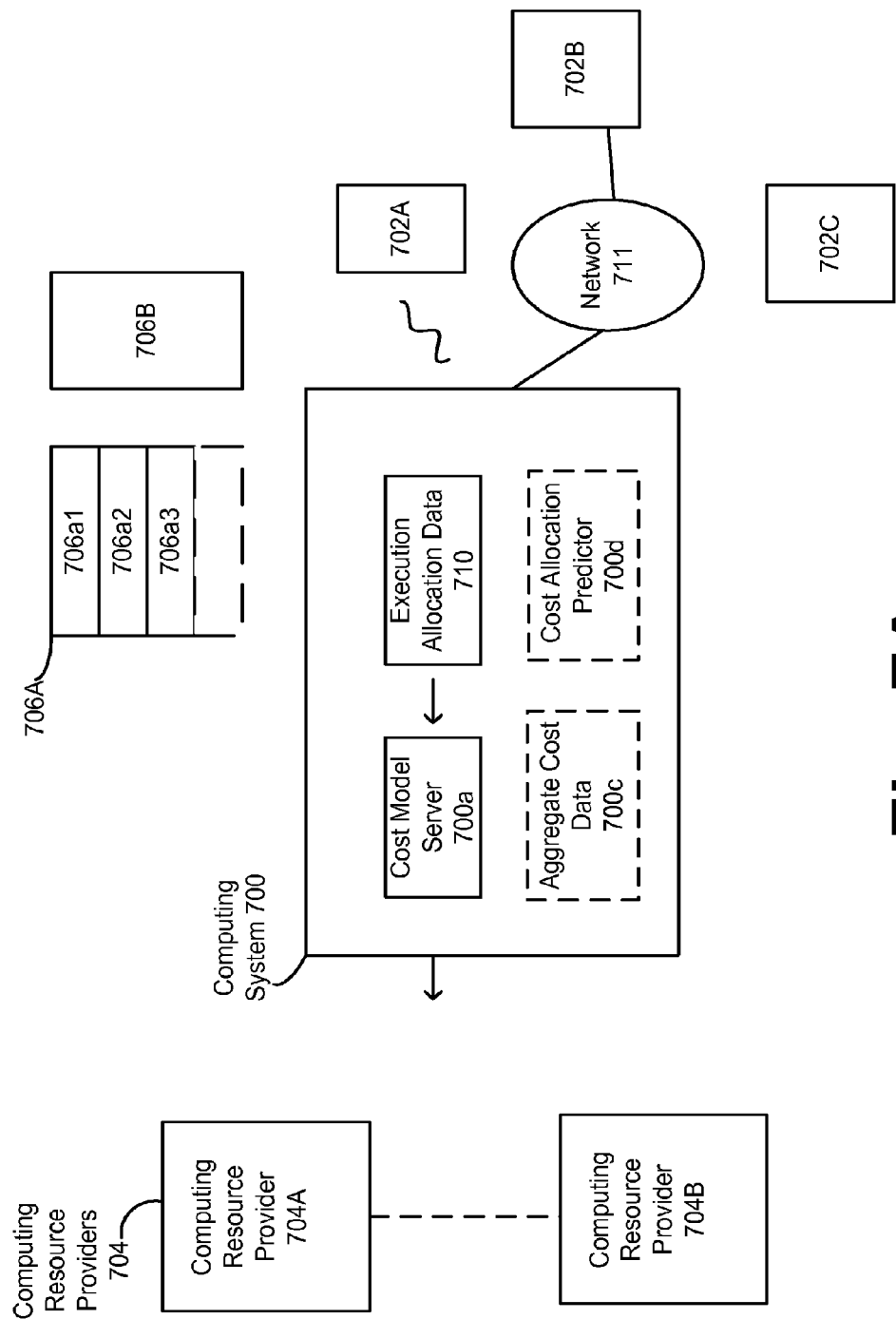
FIG. 7A depicts an Elastic computing environment in accordance with another embodiment of the invention.

FIG. 7A depicts an Elastic computing environment 700 in accordance with another embodiment of the invention. Referring to FIG. 7A, a computing system 700 can effectively provide an execution-allocation cost model server (or a cost model service) 700a for various other computing systems 702, including a mobile device 702A, a Personal Computer (PC) (e.g. desktop or laptop PC) 702B connected via a network 711, and a computing system 702C. Generally, the execution-allocation cost model server 700a is operable to determine the relative extent of allocation of execution executable computer code (or executable code) 706 between a computing system 702 and various computing resource providers 704 (e.g., Clouds 704a and 704b).

By way of example, execution-allocation cost model server (or cost model service) 700a can be operable to: determine the extent of execution allocation of the computer executable computer code 706A and/or 706B between the mobile device 702A and the computing resource providers 704, determine the extent of allocation of the computer executable computer code 706A and/or 706B for execution to, or between, the mobile device 702A and the computing resource providers 704. As such, the execution-allocation cost model server may, for example, determine to allocate and/or cause allocation of execution such that a first portion of the executable code 706A (706a1) is executed using the internal computing resources of the mobile device 702A, a second portion of the executable code 706A (706a2) is to be executed using the computing resources of the computing resource provider 704A, a second portion of the executable code 706A (706a2) is to be executed using the computing resources of the computing resource provider 704B, and so on. It should be noted that execution-allocation cost model server 700a is generally operable to determine the extent of allocation of execution at run time of the executable code 706 (e.g., when the executable code 706 is to be loaded for execution or is being executed). By way of example, execution-allocation cost model server 700a can determine the extent of allocation of execution when one or more portions of the executable code 706 are being executed by the mobile device 706A and/or computing resource provider 704A.

Generally, the execution-allocation cost model server 700a can be operable to determine, during the runtime of the executable codes 706, a current extent of execution-allocation to, or between, a computing system 706 and various computing resource providers 704. As a result, at a given time during the runtime of a particular executable code (e.g., 706A), the execution-allocation cost model server 700*a* can determine a current relative extent of allocation, and allocate and/or cause allocation of a specific portion the executable code (e.g., executable code portion 706A) to, or between, a specific computing device (e.g., mobile device 702A) and one or more computing resource providers 704 in accordance with the current extent of execution allocation. It will also be appreciated that the execution-allocation cost model server 700*a* can be operable to effectively change, monitor, and/or update the current extent of execution allocation dynamically during the runtime of the executable code 706A such that a specific portion the executable code (e.g., executable code portion 706*a*1) is, for example, effectively relocated or migrated from a specific computing device (e.g., mobile device 702A) to a particular computing resource provider or vice versa, or relocated or migrated from one computing resource provider 704 to another computing resource 704.

Those skilled in the art will appreciate that the execution-allocation cost model server 700*a* can be operable to determine a current extent of allocation (or a current extent of execution-allocation) based on data 710 pertaining to allocation of execution of executable computer code (or execution-allocation data) 706 to, or between, at least one computing system 702 and one or more computing resource provides 704. Generally, the execution-allocation data 710 can be based on one or more criteria associated with a computing system 702 and/or computing resource 704. The execution-allocation cost model server 700*a* can obtain execution-allocation data 710 as input, determine, based on the execution-allocation data 710, a current extent of execution-allocation, and provide the current extent of execution-allocation as output data that allocates and/or causes allocation of execution accordingly (e.g., output data as an indication or a command/request to a computing system or a computing resource provider).

It should also be noted that the execution-allocation cost model server 700*a* can also be operable to obtain aggregate cost data 700*c* pertaining to general or specific execution costs associated with execution of various executable code 706 and various computing systems 702. By way of example, general execution cost of a particular executable code (e.g., 706*a*) or one of its components on any computing system 706, or specific execution cost of a particular portion of a executable code (e.g., 706*a*1) on a particular computing system (e.g., 702*a*) or computing resource provider (e.g., 704*a*) can be obtained and stored as aggregate cost data 700*c*. As another example, execution cost of any executable code executed by a particular computing system (e.g., 702*a*) can be logged as historical data.

Historical data can be used to make prediction (or estimation) regarding execution of particular portion of executable code (e.g., 706*a*1). For example, historical data pertaining to execution costs of computing systems 702A and 702B can be used to make a prediction regarding the cost of execution by the computing 702C. Similarity of devices, cloud resource providers, user preferences, networks and network connections are among a few examples that can be used to make a prediction re cost of execution.

Generally, aggregate cost data 700*c* can be effectively used by a cost allocation predictor 700*d* to predict (or estimate) the cost of allocating execution of a particular portion executable code (e.g., 706*a*1) on a particular computing system (e.g., 702*a*) or computing resource provider (e.g., 704*a*), as will be appreciated by those skilled in the art.

It should also be noted that the cost model server 700*a* can be operable to effectively use a prediction based on the aggregate cost data 700*c* instead of using a cost model to make a decision regarding the allocation of execution.

Figure 7B:
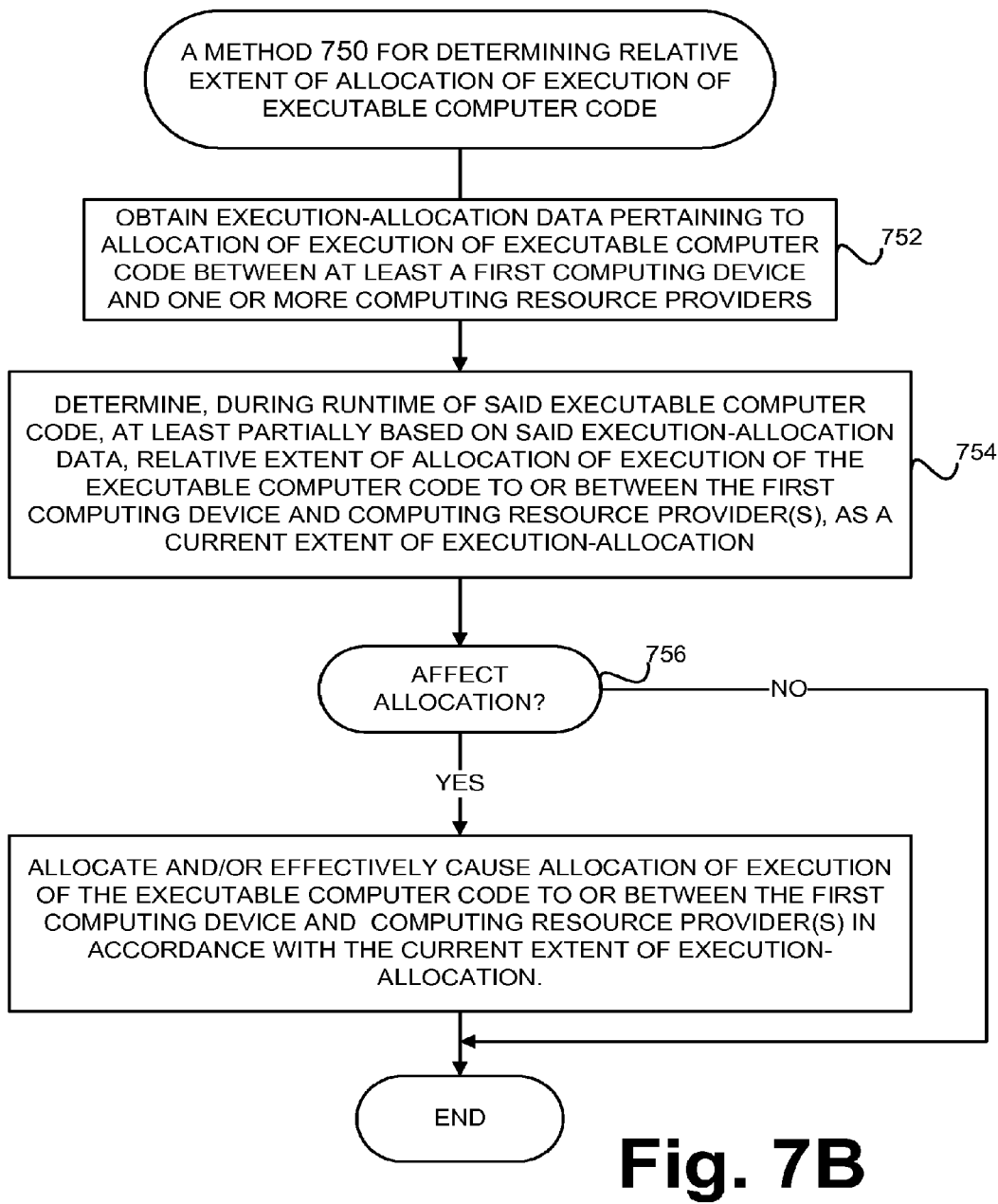
FIG. 7B depicts a method for determining the relative extent of allocation of execution of executable computer code to, or between, a first computing device and one or more computing resource providers in accordance with one embodiment of the invention.

FIG. 7B depicts a method 750 for determining relative extent of allocation of execution of executable computer code to or between a first computing device and one or more computing resource providers in accordance with one embodiment of the invention. Referring to FIG. 7B, initially, execution-allocation data pertaining to allocation of execution of executable computer code between at least a first computing device and one or more computing resource providers is obtained (752). Next, it is determined (754), during runtime of the executable computer code, at least partially based on the execution-allocation data, relative extent of allocation of execution of the executable computer code to or between at a least the first computing device and one or more computing resource providers. The relative extent of allocation of execution can be determined, during runtime, as a current extent of execution-allocation. It should be noted that execution-allocation data may also be obtained (752) during runtime as current execution-allocation data. Thereafter, it is determined (756) whether to affect the allocation of execution based on the current extent of execution-allocation as determined (754) based on execution-allocation data. Accordingly, the allocation of execution of the executable computer code can be affected (756). More particularly, the execution can be allocated or caused to be allocated to one or between at least the first computing device and one or more computing resource providers in accordance with the current extent of execution-allocation. Those skilled in the art will readily know that the determination (756) of whether to affect the allocation of execution can represent a design or programming option, and/or can, for example, be determined based on user input, preference and/or profile, the executable computer code, etc. Generally, the current execution-allocation data can be generated as output and may be provided, for example, as an indication, request, or command to the first computing device and/or computing resource providers to affect the allocation of execution of the executable computer code.

Figure 8:
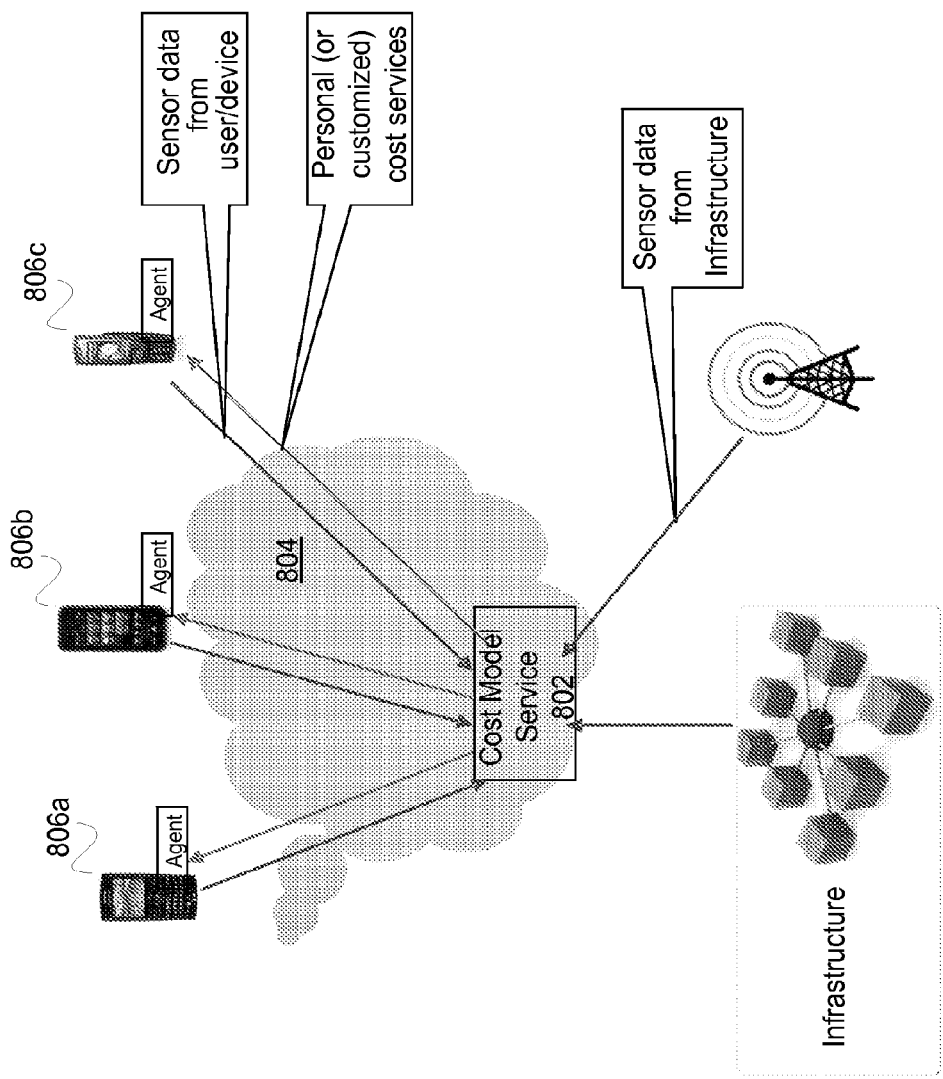
FIG. 8 depicts a cost model service on a Cloud in accordance with one embodiment of the invention.

FIG. 8 depicts a cost model service 802 on a Cloud 804 in accordance with one embodiment of the invention. Referring to FIG. 8, cost model service 802 is provided on Cloud 804 and can be operable to distinguish different sensor data (or sensor information). By way of example, the cost model service 802 can be operable to distinguish sensor data obtained from the Cloud 804 (and possibly network infrastructure data) and from sensor data obtained from individual Elastic Devices 806. Those skilled in the art will appreciated that the ability to make such distinctions can further enhance the accuracy and performance of cost models used by the cost model service 802, especially for situations where numerous Elastic Devices 806 and/or Clouds are supported, as may be the case in real commercial deployments.

Cost model service 802 can also be operable to distinguish different user preferences and build customized cost models respectively for individual users and/or Elastic Devices 806. In other words, the cost model service 802 can provide a personalized or customized cost service. In addition, cost model service 802 can be operable to develop or build a cost model that is suitable for a set of users and/or devices with similar traits (e.g., similar user cost preferences, similar device capabilities and/or configurations).

To further elaborate, the following provides an exemplary power cost model that can be used in connection with the present invention. One objective of the power cost model is to onload/offload different components from/to a cloud platform during load-time and/or run-time of an application, such that its power consumption on the Elastic Device (ED) is minimal. Note that this exemplary model does not consider execution power consumptions on the cloud platforms.

On each state of the target application, its power Graph is a directed graph G=(V, E), where V is the set of active components E is data dependency (v1,v2) ∈ E means v2 has input from v1 v0 is for any other web services/external data resources

An active components is specifies as tuple v=(s, location, ep), where s is state: active/inactive location: device/cloud ep: execution power cost, and, $$-ep(v) = \begin{cases} 0 \text{ if } (v \cdot \text{location} = \text{cloud}) \\ localexecutionsubodel \text{ if } (v \cdot \text{location} = \text{device}) \end{cases}$$

A data dependency is a directed and valued edge in G, and e(v1,v2): size of data tp(v1,v2): transportation power cost, and $$-tp(v1, v2) = \begin{cases} 0 \text{ if } (v1 \cdot \text{location} = v2 \cdot \text{location}) \\ cpr \times e(v1, v2) \text{ if } (v1 \cdot \text{location} \neq v2 \cdot \text{location}), \end{cases}$$

where cpr is cost of power consumption rate between ED and cloud, which depends on, e.g., signal strengthen, network interfaces, network traffic status, etc.

A graph transformation is a set of actions to change G(V, E) to G'(V', E'), where:

create/delete a component:

v.state'=active/inactive onload/offload a component:

v.location'=device/cloud update e(v1,v2) with a new value based on v.location' update ep(v) if v.location is changed update tp(v1,v2) if either v1.location or v2.location is changed Basic rules:

if ∃v∈ V, e(v0,v)|G>0, v.location=device∧v.location'=cloud, then e(v0,v)|G'=0

Also update tp(v1,v2) if v1 changes for any v2 if v.location=cloud∧v.location'=device, then ep(v) is local execution power cost and possibly e(v0,v)>0

Figure 9:
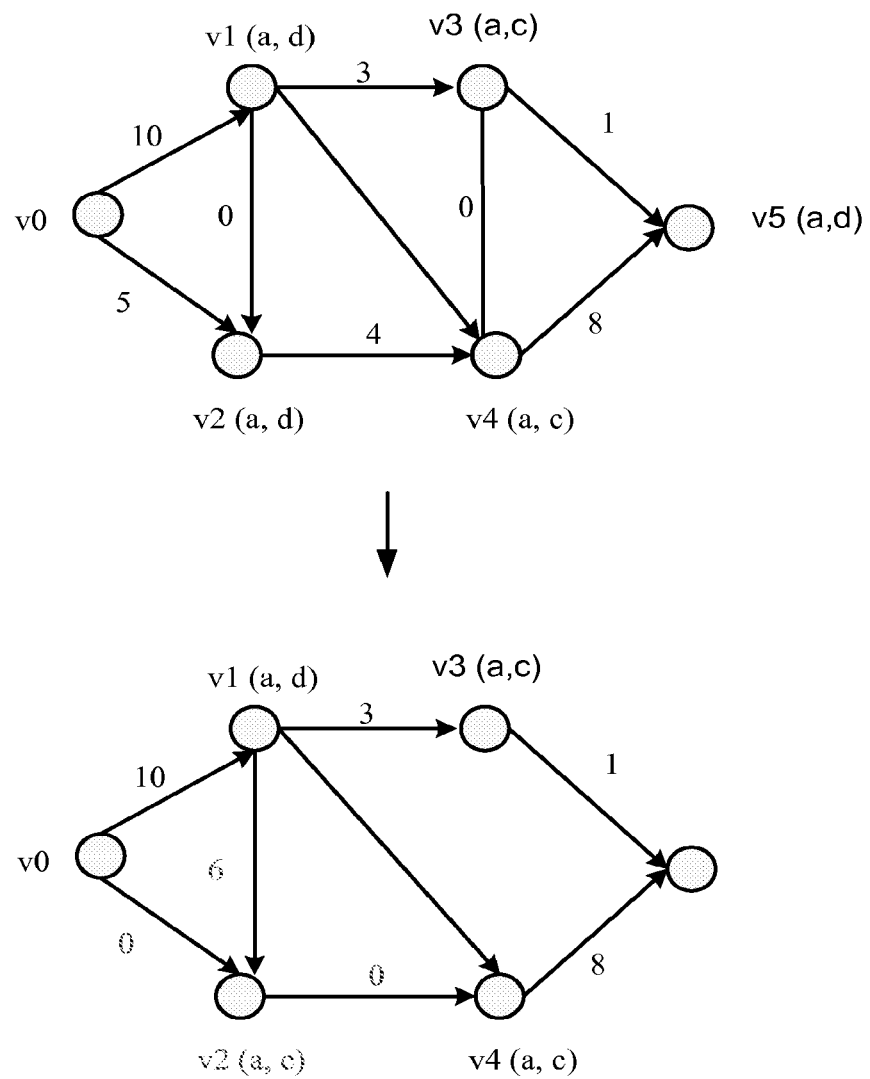
FIG. 9 depicts an exemplary power graph transformation that can be used in connection with the invention.

FIG. 9 depicts an exemplary power graph transformation that can be used in connection with the invention. Referring to FIG. 9, the power cost objective function is to find out a graph transformation result G=(V,E), such that:

$$\text{Min}\left(\sum_{i=0}^{|V|} ep(v_i) + \sum_{i,j=0}^{|V|} tp(v_i, v_j)\right)$$

Once this power model is deployed on the cloud-side cost service, it decides that it needs to monitor/measure the following parameters:

execution power cost for each component of the application on ED, which can be static, e.g., via static analysis of its instructions types and their power consumption cost per instruction, or it can be dynamically monitor by some sensors deployed on ED.

Transportation power cost per MB data transportation, which is, in turn, determined by monitoring signal strengthen, network status, possible network interfaces on ED.

Size of data communication between components both on cloud and ED.

The cost service then decides which parameters are monitored/measured by cloud-side and EO-side, for example, data communication and network status can be measured on cloud-side, while execution power cost of ED should be on the EO-side.

When the cost service obtains necessary data, it can build a power graph for this application, and make possible decisions on the graph transformation to make the total power cost minimum, and then instruct the EM on the ED to enforce possible actions.

Possible way to trigger decision making by cost service:

Any parameter changes on ED and cloud side

Significant change of some parameters, which can be found via complex machine learning approach such as Bayesian Network by collecting data from many similar devices and applications Prediction based on statistical study and/or machine learning Machine Learning and Elastic Systems As noted above, machine learning can be used by a cost service to make decisions regarding the cost of allocating executable content to internal and external computing resources. Generally, machine learning can be used to determine how to allocate portions (or parts) of executable computer code between internal and external computing resources. As is generally known in the art, machine learning can allow a computing system to change its behavior based on data (or machine learning data).Machine learning data can, for example, be received from a sensor or users of the computing system, retrieved from a database, or received as system data. Machine learning can allow "automatic" learning for reorganization patterns that may be complex so that intelligent decisions can be made automatically. More particularly, a computing system can be operable to use machine learning in order to make decisions regarding allocation of various portions of executable computer code between its internal computing resources and one or more external computing resources including at least one Dynamically Scalable Computing Resource (DSCR) 106.

Figure 10A:
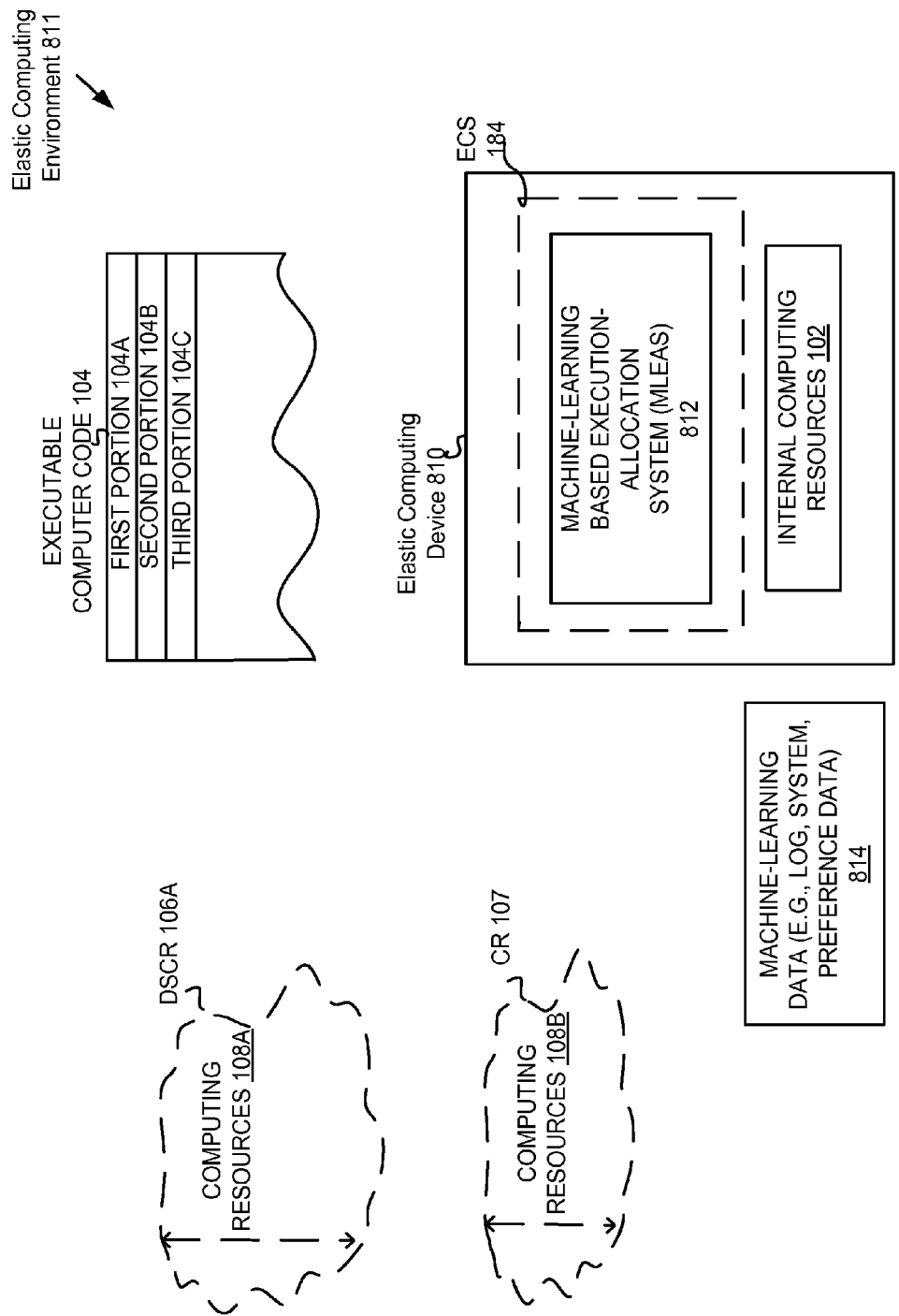
FIG. 10A depicts an Elastic computing device (or system) in an Elastic computing environment in accordance with one embodiment of the invention.

To further elaborate, FIG. 10A depicts an Elastic computing device (or system) 810 in an Elastic computing environment 811 in accordance with one embodiment of the invention. Referring to FIG. 10A, the Elastic computing device 810 can use machine learning in order to make decisions regarding allocation of various portions of executable computer code 104 between internal computing resources 102 and external computing resources 108 effectively provided by a DSCR 106. As suggested by FIG. 10A, external computing resources 108 may also include one or more other computing resources (shown as one or more computing resources 107). In any case, the Elastic computing device 810 can be operable to decide whether to allocate each one of the individually executable computer code portions (e.g., 104A, 104B, 104C) of the executable computer code 104 to its internal computing resources 102, or to one or more external computing resources provided by one or more external computing resource providers including at least one DSCR 106.

More particularly, a machine-learning based execution-allocation system (MLEAS) 812 can be provided as a part of the Elastic computing device 810. The MLEAS 812 can be provided using computer executable code (or software) and/or hardware components to allow the Elastic computing device 810 to utilize machine learning in order to make decisions regarding allocation of various portions of executable code 104 in the Elastic computing environment 811, as will be appreciated by those skilled in the art. As noted above, machine learning can allow a computing system to change its behavior based on data (or machine learning data). Referring to FIG. 10A, the MLEAS 812 can use machine learning data 814. Machine learning data 814 can, for example, include log data, sensor or system data, and preference data, including user preference data. As such, the MLEAS 812 can be operable to "automatically" learn execution allocation behavior to allow automatically making decisions regarding allocation of various individually executable portions of executable code 104, based on log or historical, sensor, system, preferences and other factors.

Specifically, the MLEAS 812 can be operable to determine, based on machine learning, how to allocate individually executable portions of executable computer code 104 for execution between the internal computing resources 102 and external resources 108, including the DSCR 106. By way of example, the MLEAS 812 can use machine learning to determine that the individually executable computer code portion 104A is to be allocated for execution to DSCR 106, but the individually executable computer code portion 104B is to be allocated for execution to internal resources 102, and so on. In addition, the MLEAS 812 can be operable to use machine learning in order to allocate or automatically allocate individual portions of executable computer code 104 for execution in the Elastic computing environment 811. As such, the MLEAS 812 may be operable to automatically allocate each one of the individually executable portions of the executable computer code, either to the internal computing resources 102 or to the external computing resources 108, based on machine learning and without requiring additional input (e.g., user input).

It should be noted that the MLEAS 812 can be provided as part of an Elastic computing system (ECS) 184 as described above (e.g., ECS 101 depicted in FIG. 1A). As a result, the Elastic computing device 810 is capable of performing functions described above with respect to computing devices with an Elastic computing system (e.g., computing devices 100). As such, the MLEAS 812 can be operable to determine, based on machine learning, how to allocate various portions of executable computer code 102 for execution in the Elastic computing environment 811 during the runtime of the executable computer code 104 when, for example, one or more of the plurality of the executable portions of executable computer code 104 are to be loaded for execution, are loaded for execution by the Elastic computing device, or are being executed in the Elastic computing environment 811 by the internal computing resources 102 and/or external computing resources 108.

It should also be noted that a cost modeling agent (not shown) (e.g., cost modeling agent 610) may be operable on the Elastic computing device 810 to utilize a cost model to at least initially make decisions regarding the allocation of executable content. In particular, data can be collected using the cost model and provide as input to the MLEAS 812 for machine learning.

Figure 10B:
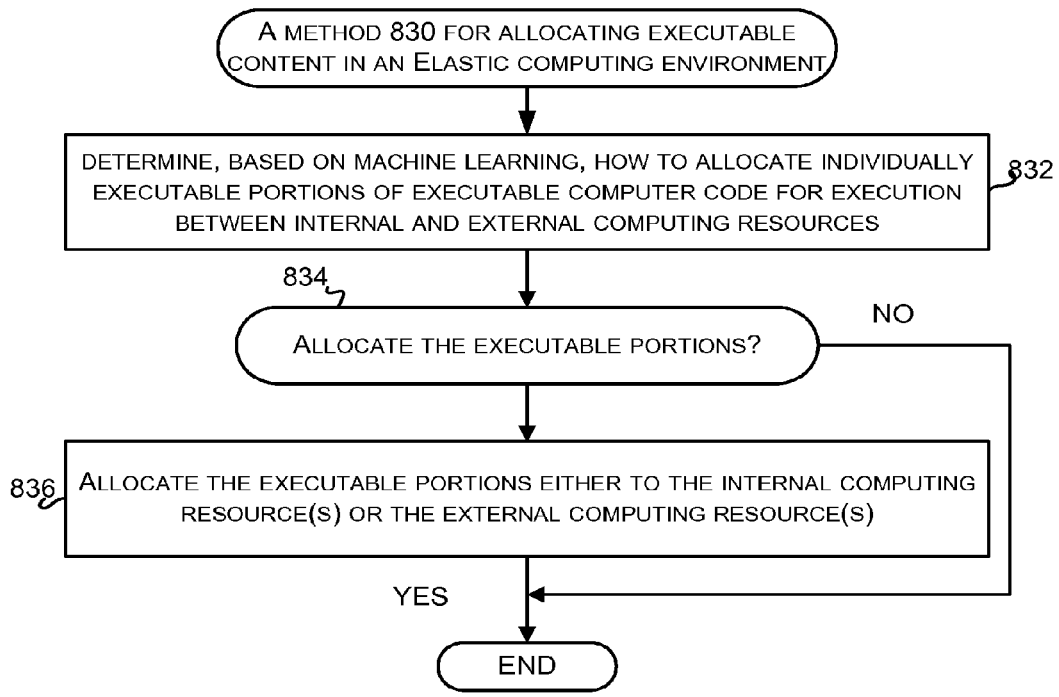
FIG. 10B depicts a method for allocating executable content in an Elastic computing environment in accordance with one embodiment of the invention.

FIG. 10B depicts a method 830 for allocating executable content in an Elastic computing environment in accordance with one embodiment of the invention. Method 830 can, for example, be performed by the Elastic computing device 810 or another computing system (e.g., a server) on behalf of the computing device 810, or by the DSCR 106A. Referring to FIG. 10B, initially, it is determined (832) based on machine learning, how to allocate individually executable portions of executable computer code for execution between internal and external computing resources of the Elastic computing environment, which can include a dynamically scalable resource. Next, it is determined (834) whether to allocate the executable portions of executable computer code for execution, and the executable portions can be allocated (836) either to one or more internal computing resources, or one or more external computing resources in accordance with the execution allocation configuration determined (834) based machine learning. The determination (834) of whether to allocate the executable portions can, for example, represent a design choice or be made based on one or more conditions and/or events. It should be noted that allocation (836) can be made automatically without requiring specific input from the user as how to allocate the executable code portions. However, a user may be prompted and/or notified of the allocation, or allocation can be subject to general or specific approval of a user. As such, a user may, for example, be prompted to approve a recommended allocation configuration or approve allocation to an external resource provider. In any case, machine learning can be used to determine how to allocate the executable code portions without requiring user input.

Machine learning techniques or algorithms that can be used for allocation of execution in an Elastic computing device may vary widely. These techniques can, for example, include "supervised learning," "unsupervised learning," "semi-supervised learning," "reinforcement learning," "transduction," and "learning to learn." In supervised learning, a function the maps given input to output can be generated based on or by analyzing input-output examples. In supervised learning, a set of inputs are mapped by using techniques such as clustering. Semi-supervised learning combines both labeled and unlabeled examples to generate an appropriate function or classifier. In reinforcement learning, a machine can learns how to act given an observation of the world. As such, every action may have an impact in an environment, and the environment can provide feedback in the form of rewards guiding the learning algorithm. Transduction tries to predict new outputs based on training inputs, training outputs, and test inputs. In learning to learn, a machine can learn its own inductive bias based on previous experience.

It will be appreciated that supervised learning may be a better and/or more practical solution, especially for portable or mobile devices since it may be relatively more cost effective to implement for mass consumption. As such, techniques for using supervised learning (or supervised machine learning) to allocate execution of executable computer code in an Elastic computing environment will be discussed in greater detail below.

Supervised learning is a form of machine learning. Generally, supervised learning deduces a function from training data which can include pairs of input objects and desired outputs typically presented as vectors or in a vector form. A primarily objective of supervised learning is to predict the value of the deduced function for any valid input object in view of a number of training examples provided as the training data. Supervised learning can, for example, be used with a Naive Bayesian framework or a Naive Bayes classifier. Classification can be made using Naive Bayes as the following simple classic example describes for data consisting of fruits described by their color and shape. In the example, Bayesian classifiers can operate as: "If you see a fruit that is red and round, which type of fruit is it most likely to be, based on the observed data sample. In future, classify red and round fruit as that type of fruit." Difficulty may arise when more than a few variables and classes are present in more practical applications. As a result, an enormous number of observations would be required to estimate the probabilities for several variable and classes. Naive Bayes classification can circumvent this problem by not requiring an enormous number of observations for each possible combination of the variables. Rather, in Naive Bayes classification, the variables are assumed to be independent of one another. In other words, the effect of a variable value on a given class is independent of the values of other variables to simplify the computation of probabilities. This assumption is often called "class conditional independence." By way of example, the probability that a fruit that is red, round, firm, 3" in diameter, etc. will be an apple can be calculated from the independent probabilities that a fruit is red, that it is round, that it is firm, that it is 3" in diameter, etc.

Naive Bayes classification is based on Bayes Theorem which can be stated as follows: "P(H|X)=P(X|H)P(H)/P(X)"

Let X be the data record (case) whose class label is unknown. Let H be some hypothesis, such as "data record X belongs to a specified class C." For classification, the object is to determine P (H|X)—the probability that the hypothesis H holds, given the observed data record X. P (H|X) is the conditional (or posterior) probability of H conditioned on X. For example, the probability that a fruit is an apple, given the condition that it is red and round. In contrast, P(H) is the prior (or unconditioned) probability, or a priori probability, of H. In this example P(H) is the probability that any given data record is an apple, regardless of how the data record looks. The posterior probability, P (H|X), is based on more information (such as background knowledge) than the prior probability, P(H), which is independent of X. Similarly, P (X|H) is posterior probability of X conditioned on H. That is, it is the probability that X is red and round given that it is known that X is an apple. P(X) is the prior probability of X, i.e., it is the probability that a data record from our set of fruits is red and round. Bayes theorem provides a way of calculating the posterior probability, "P(H|X), from P(H), P(X), and P(X|H)".

As noted above, training data can be used for supervised learning. The training data can be provided as log (or historical data) for supervised learning by an execution allocation system (e.g., the MLEAS 812 depicted in FIG. 10A) in accordance with the principles of the invention.

Figure 11A:
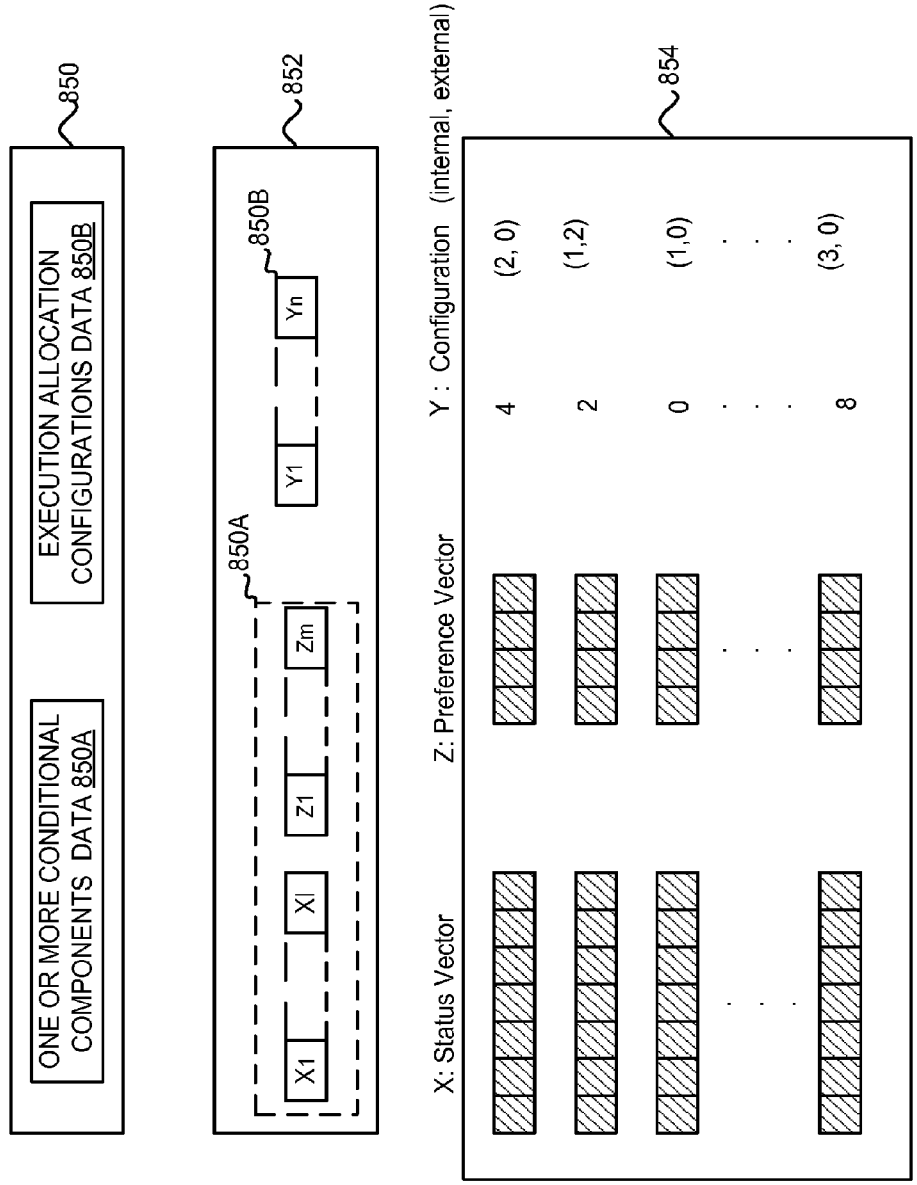
FIG. 11A depicts training data that can be provided to a supervised learning based execution-allocation system in accordance with various embodiment of the invention.

To further elaborate, FIG. 11A depicts training data that can be provided to a supervised-learning-based execution-allocation system in accordance with various embodiments of the invention. The training data can, for example, be provided as log data or historical data. Referring to FIG. 11A, training data 850 can be generally provided with conditional component(s) data 850A and execution allocation data 850B. The conditional component(s) data 850A is representative of one or more conditional components that can be taken into consideration (e.g., status data pertaining to status of a system and/or its computing environment, preference data pertaining to one or more selectable preferences). Execution allocation data 850B is representative of various configurations of execution allocation. By way of example, a configuration can be represented as: "(A, B and C)"—a first executable portion A allocated for execution using internal computing resources, and second and third executable portions B and C are allocated for execution using internal computing resources. As another example, a configuration can be represented as: "(A, B, C)"—a first executable portion A allocated for execution using internal computing resources, and second and third executable portions B and C are respectively allocated for execution to first and second external resources.

Training data can be represented in a vector form. Referring back to FIG. 11A, training data 852 can be representative of training data 850 provided in a vector form where the conditional components data are depicted for two individual conditional components, X and Y. Each individual component can have multiple sub-components. By way of example, a status vector (X) can be composed of a multiple number of status related subcomponents, namely: upload bandwidth, throughput, power level, memory usage, file cache, etc. Similarly, a preference vector can be composed of: monetary cost, power consumption, processing time, security, etc.

Referring back to FIG. 11A, training data 854 can provide observed status (X) and preference (Y) vectors for various execution allocation configurations (Y) along with the number (or frequency) of occurrences of individual configurations. Training data 854 is representative of exemplary log (or historical) data that can be used as a basis for training data of a supervised learning mechanism.

Figure 11B:
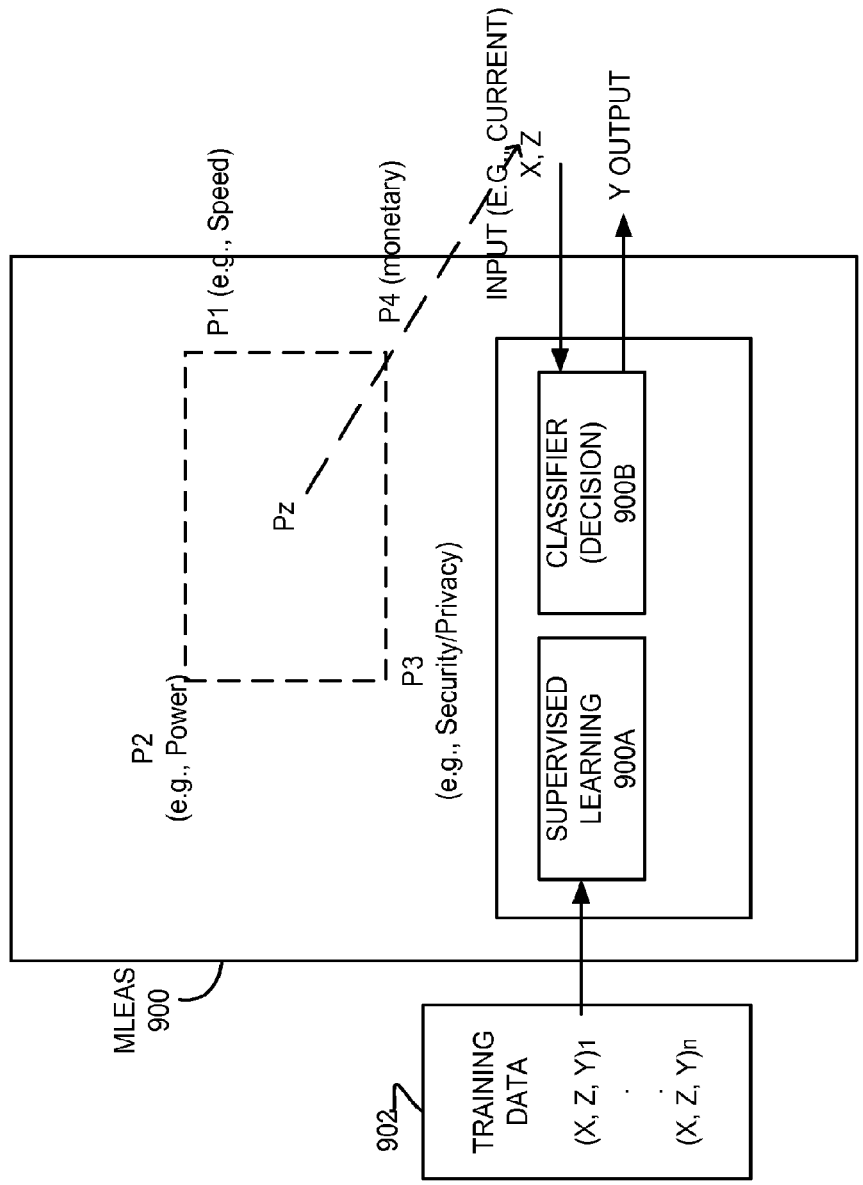
FIG. 11B depicts a MLEAS operable to use training data for supervised learning in accordance with another embodiment of the invention.

To elaborate even further, FIG. 11B depicts a MLEAS 900 operable to use training data 902 for supervised learning in accordance with another embodiment of the invention. MLEAS 900 is an example of the MLEAS 812 depicted in FIG. 10A. Referring to FIG. 11B, training data 902 can, for example, be in form similar to data 854 depicted in FIG. 11A. As such, training data 902 can be represented in a (X, Z, Y) form, where X and Y are respectively status and preferences vectors, and Y is the execution allocation configuration (also shown in FIG. 11A). The training data 902 can, for example, be extracted from log data and provided to the supervised learning component 900a of the MLEAS 900. Generally, the supervised learning component 900a can use the training data 902 to generate learned data (e.g., a set of prior and conditional probabilities) that can be used by the classifier (or decision) component 900b to determine a desirable execution allocation configuration as Y output for a given input (e.g., current) condition that can be represented as input (X, Z) in the exemplary embodiment depicted in FIG. 11B. In other words, based on the learned data provided by the supervised learning component 900a, the classifier component 900b can determine how to allocate various portions of executable code (not shown) in a situation represented by one or more conditions, such as, for example, the current status of the device and selected preferences. As suggested in FIG. 11B, an input Z can be representative of an input (e.g., current selected preference) provided with respect to a set of potentially diverse preferences, namely, speed, power saving, security/privacy and monetary cost.

For example, if the MLEAS 900 uses a Naive Bayesian classifier, first prior and conditional probabilities can be calculated by the supervised learning component 900a, and then the classifier 900B can use the prior and conditional probabilities to recommend an execution allocation configuration (Output Y) for Weblets given the current selected user preferences (Z) and status of a device (X).

In other words:
First, compute prior and conditional probabilities
Then, recommend a configuration using a Naïve Bayes classifier, where for each configuration:

$$y^* = \underset{y}{\operatorname{argmax}}\ p(y) \prod_i p(x_i \mid y) \prod_j p(z_j \mid y)$$

$y \in \{0,1,2, \ldots, N-1\}$, $i \in \{1,2,3, \ldots, L\}$, $j \in \{1,2,3 \ldots, M\}$
$x_i$ is the i-th status component value. Each status component can have a different number of states.
$z_j$ is the j-th preference component value. Each preference component can have a different number of states.
N is the number of possible configurations, L is the number of status components comprising a status vector, and M is the number of preference components comprising a preference vector.

As another example, only the status vector (X) can be used to determine how to allocate Weblets for execution between internal and external computing resources. In other words:

$$y^* = \underset{y}{\operatorname{argmax}}\ p(y) \prod_i p(x_i \mid y)$$

$y \in \{0,1,2, \ldots, N-1\}$, $i \in \{1,2,3, \ldots, L\}$,
$x_i$ is the i-th status component value. Each status component can have a different number of states.
N is the number of possible configurations and L is the number of status components comprising a status vector.

As yet another example, only the preference vector (Z) can be used to determine how to allocate Weblets for execution between internal and external computing resources. In other words:

$$y^* = \underset{y}{\operatorname{argmax}}\ p(y) \prod_j p(z_i \mid y)$$

$y \in \{0,1,2, \ldots, N-1\}$, $j \in \{1,2,3, \ldots, M\}$,
$z_j$ is the j-th preference component value. Each preference component can have a different number of states.
N is the number of possible configurations and M is the number of preference components comprising a preference vector.

Figure 11C:
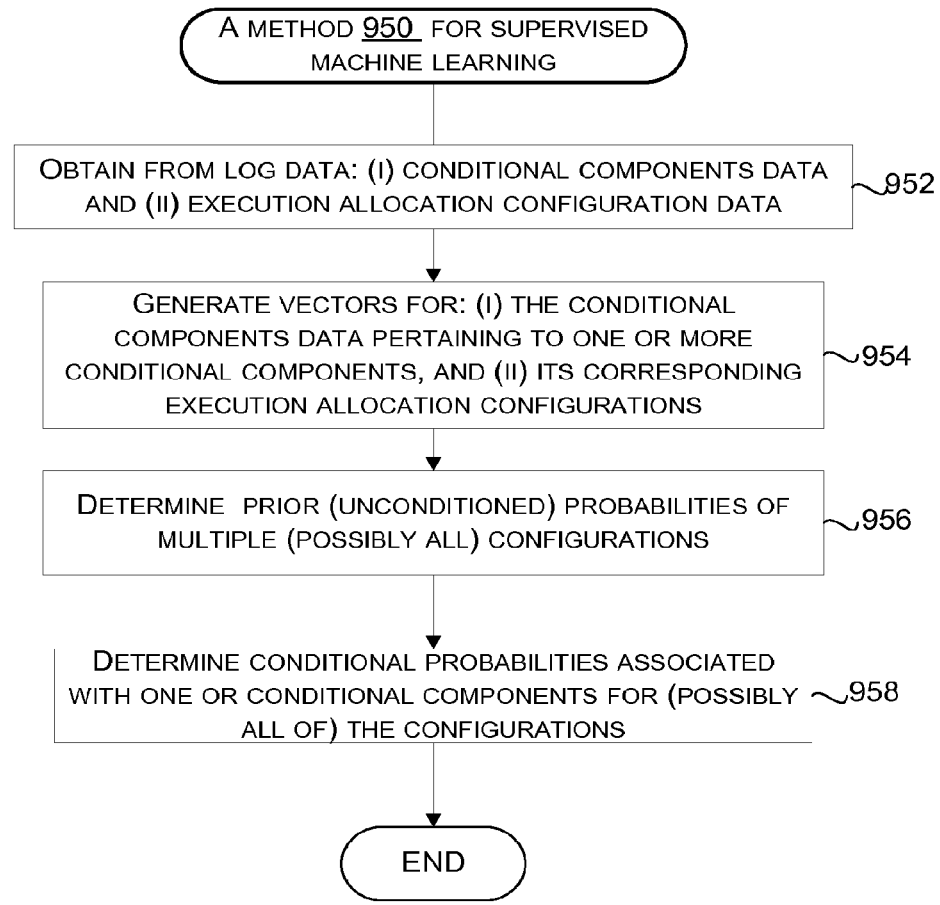
FIG. 11C depicts a method of supervised machine learning for automatically determining execution allocation in an Elastic computing environment in accordance with one embodiment of the invention.

To elaborate even further, FIG. 11C depicts a method 950 of supervised machine learning for automatically determining execution allocation in an Elastic computing environment in accordance with one embodiment of the invention. Method 950 can, for example, be used by the supervised learning component 900a of the MLEAS 900 depicted in FIG. 11B. Referring to FIG. 11C, initially, conditional component data and execution allocation configuration data are obtained (952) from log data. The conditional component data pertains to one or more conditional components (e.g., status, preferences). Next, vectors are generated (954) for: (i) the conditional component data and (ii) its corresponding execution allocation configurations. Thereafter, prior (or unconditioned) probabilities are determined for at least a plurality of possible execution allocation configurations. It should be noted that for more accurate prediction, it is typically desirable to determine (956) the prior probabilities for all possible execution allocation configurations. Similarly, conditional probabilities associated with one or more conditional components can be determined for a plurality or possibly for all of the execution allocation configurations. By way of example, all individual conditional probabilities associated with status and preference vectors can be determined for every possible configuration. As another example, only the conditional probabilities associated with a status vector, or those associated with a preference vector, can be determined for multiple or all possible execution allocation configurations. Method 950 ends after the conditional probabilities are determined (958). It should be noted that the prior and conditional probabilities determined by method 950 can be provided as input or training data for supervised learning in order to determine execution allocation in an Elastic computing environment.

Figure 11D:
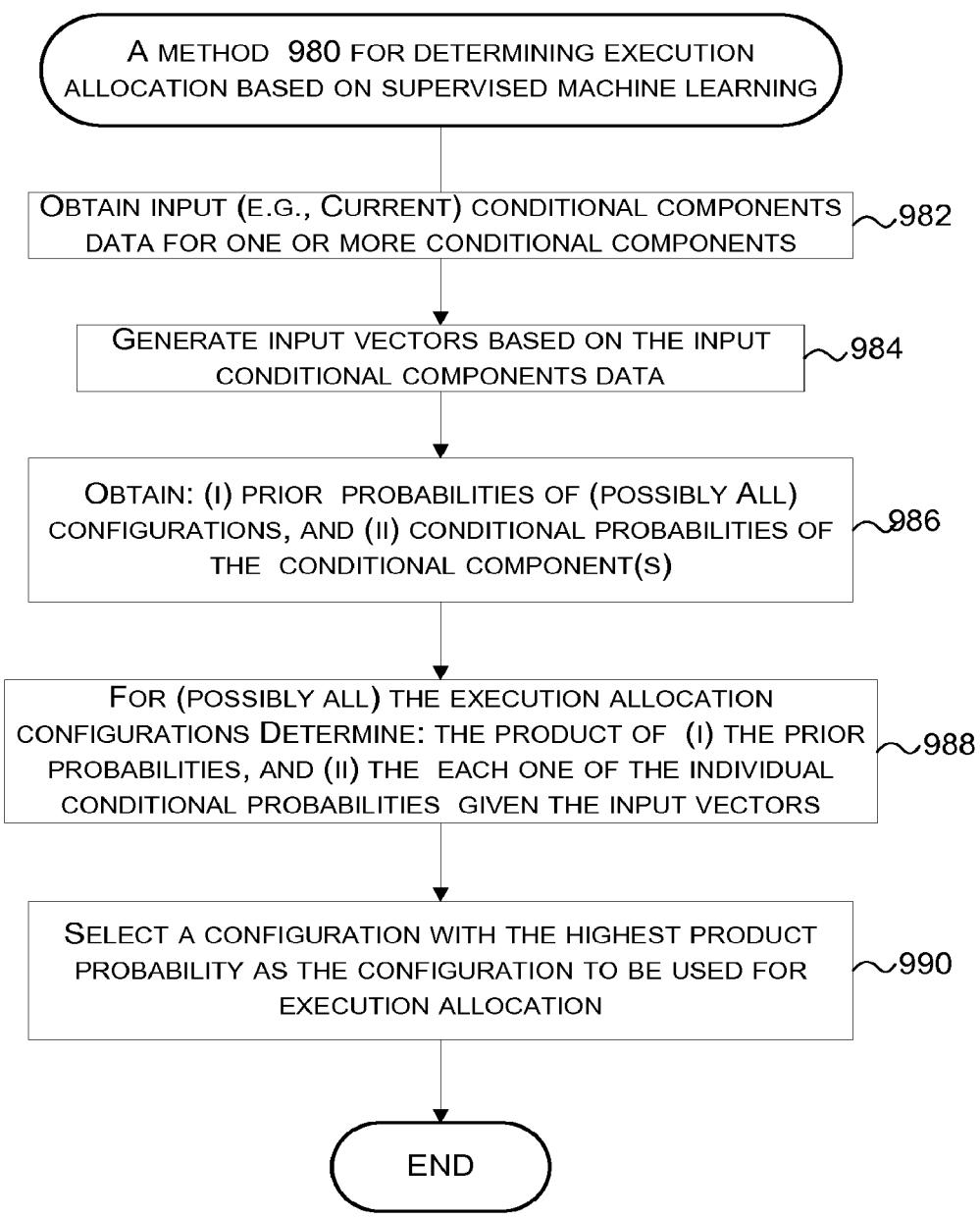
FIG. 11D depicts a method for determining execution allocation in an Elastic computing environment based on supervised learning in accordance with one embodiment of the invention.

To further elaborate, FIG. 11D depicts a method 980 for determining execution allocation in an Elastic computing environment based on supervised learning in accordance with one embodiment of the invention. Method 980 can use the prior and conditional probabilities determined by method 950 depicted in FIG. 11C. Method 980 can, for example, be used by the classifier 900b of the MLEAS 900 depicted in FIG. 11B. Referring to FIG. 11D, initially, input (e.g., current) conditional component(s) data pertaining to one or more conditional components (e.g., status, preference) is obtained (982). By way of example, the input conditional data can represent a current condition or situation of the device with respect to the current status and selected preferences of the device. In any case, input vectors are generated (984) based on the input conditional data. Next, determined prior and conditional probabilities associated with multiple (possibly all of) execution allocation configurations are obtained (986). Thereafter, the product of: (i) the prior probabilities and (ii) the conditional probabilities are determined (988) for the multiple (possibly all of) execution allocation configurations given the input vectors of the conditional components. Accordingly, an execution allocation configuration with the highest product probability can be selected (990) as the configuration to be used (or recommended for use) for allocating individual executable components of computer executable code (e.g., Weblets) for execution by internal and external computing resources of an Elastic commuting environment. Method 950 ends after the execution allocation configuration has been selected (990).

It should be noted that simulated data can be used rather than observed data. Simulated data can be used in various situations, including situations when observed data is not available yet (e.g., a "cold start") or when it is not desirable or feasible to record actual data. Simulated data can be generated by simulation or testing a subset or all of the possible execution allocation configurations. Generally, an execution allocation cost model can be used to determine or estimate the cost of execution allocation of an execution allocation configuration.

For example, given a conditional component, status and configuration data can be collected by repeatedly testing all possible execution allocation configurations. Then, cost vectors corresponding to the status and execution allocation configurations can be determined. Thereafter, for all the execution allocation configurations, the prior probabilities and individual conditional status and cost probabilities can be determined. At the decision stage, the product conditional probabilities of the cost vector and the individual status components can be used in similar manner as described above to select an execution allocation configuration as output (I.e., the configuration with the highest product probability). In other words, Naive Bayesian learning and decision can be accomplished without observed data for a preference vectors by substituting a cost vector S for the preference vector Z:

$$y^* = \underset{y}{\operatorname{argmax}}\ p(y) \prod_i p(x_i \mid y) \prod_j p(S_j = z_j \mid y)$$

or $$y^* = \underset{y}{\operatorname{argmax}}\ p(y) \prod_j p(S_j = z_j \mid y)$$

where $S_j$ is the j-th cost component variable

As will be readily appreciated by those skilled in the art various other supervised machine learning techniques can be utilized including, for example, Support Vector Machines and Logistic Regression, and Least Square Estimation. p The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A system, comprising:
   at least one processor; and
   a non-transitory processor-readable memory device storing instructions that when executed by said at least one processor causes said at least one processor to perform operations including:
   generating a customized cost model for an electronic device based on one or more cost preferences corresponding to said electronic device; and
   based on said customized cost model, reducing a power consumption cost associated with execution of computer executable code on said electronic device by generating a decision relating to allocation of one or more individual executable components of said computer executable code between said electronic device and one or more cloud computing resources for execution.

2. The system of claim 1, wherein the operations further comprise:
   obtaining sensor information associated with said electronic device;
   obtaining sensor information associated with said one or more cloud computing resources; and
   distinguishing sensor information associated with said electronic device from sensor information associated with said one or more cloud computing resources;
   wherein said customized cost model is further based on sensor information associated with said electronic device and sensor information associated with said one or more cloud computing resources.

3. The system of claim 1, wherein:
   said customized cost model identifies a plurality of parameters to monitor, and said decision is further based on said plurality of parameters; and
   said decision minimizes said power consumption cost.

4. The system of claim 3, wherein:
   at least one of said plurality of parameters is monitored by said electronic device; and
   at least one of said plurality of parameters is monitored by said one or more cloud computing resources.

5. The system of claim 3, wherein said plurality of parameters includes at least one of the following:
   for each individual executable component allocated to said electronic device, an execution power cost associated with said individual executable component;
   a transportation power cost associated with communicating data between said electronic device and said one or more cloud computing resources; and
   size of data communicated between at least one individual executable component allocated to said electronic device and at least one individual executable component allocated to said one or more cloud computing resources.

6. The system of claim 5, wherein said transportation power cost is based on at least one of the following: signal strength between said electronic device and said one or more cloud computing resources, status of network traffic between said electronic device and said one or more cloud computing resources, and one or more network interfaces on said electronic device.

7. The system of claim 1, wherein said decision comprises a decision to offload, during runtime of said one or more individual executable components, at least one of said one or more individual executable components to said one or more cloud computing resources.

8. The system of claim 1, wherein said decision comprises a decision to onload, during runtime of said one or more individual executable components, at least one of said one or more individual executable components on said electronic device.

9. The system of claim 1, wherein the operations further comprise:
   generating another customized cost model for multiple electronic devices having at least one of similar cost preferences and similar device configuration data.

10. A method, comprising:
    generating a customized cost model for an electronic device based on one or more cost preferences corresponding to said electronic device; and
    based on said customized cost model, reducing a power consumption cost associated with execution of computer executable code on said electronic device by generating a decision relating to allocation of one or more individual executable components of said computer executable code between said electronic device and one or more cloud computing resources for execution.

11. The method of claim 10, further comprising:
    obtaining sensor information associated with said electronic device;
    obtaining sensor information associated with said one or more cloud computing resources; and
    distinguishing sensor information associated with said electronic device from sensor information associated with said one or more cloud computing resources;
    wherein said customized cost model is further based on sensor information associated with said electronic device and sensor information associated with said one or more cloud computing resources.

12. The method of claim 10, further comprising:
monitoring a plurality of parameters identified by said customized cost model, and said decision is further based on said plurality of parameters;
wherein said decision minimizes said power consumption cost.

13. The method of claim 12, wherein:
at least one of said plurality of parameters is monitored by said electronic device; and
at least one of said plurality of parameters is monitored by said one or more cloud computing resources.

14. The method of claim 12, wherein said plurality of parameters includes at least one of the following:
for each individual executable component allocated to said electronic device, an execution power cost associated with said individual executable component;
a transportation power cost associated with communicating data between said electronic device and said one or more cloud computing resources; and
size of data communicated between at least one individual executable component allocated to said electronic device and at least one individual executable component allocated to said one or more cloud computing resources.

15. The method of claim 14, wherein said transportation power cost is based on at least one of the following: signal strength between said electronic device and said one or more cloud computing resources, status of network traffic between said electronic device and said one or more cloud computing resources, and one or more network interfaces on said electronic device.

16. The method of claim 10, wherein said decision comprises a decision to offload, during runtime of said one or more individual executable components, at least one of said one or more individual executable components to said one or more cloud computing resources.

17. The method of claim 10, wherein said decision comprises a decision to onload, during runtime of said one or more individual executable components, at least one of said one or more individual executable components on said electronic device.

18. The method of claim 10, further comprising:
generating another customized cost model for multiple electronic devices having at least one of similar cost preferences and similar device configuration data.

19. An electronic device, comprising:
at least one processor; and
a non-transitory processor-readable memory device storing instructions that when executed by said at least one processor causes said at least one processor to perform operations including:
receiving a customized cost model for said electronic device based on one or more cost preferences corresponding to said electronic device; and
based on said customized cost model, reducing a power consumption cost associated with execution of computer executable code on said electronic device by generating a decision relating to allocation of one or more individual executable components of said computer executable code between said electronic device and one or more cloud computing resources for execution.

20. The electronic device of claim 19,
wherein said customized cost model is further based on sensor information associated with said electronic device and sensor information associated with said one or more cloud computing resources.

21. The electronic device of claim 19, wherein:
said customized cost model identifies a plurality of parameters to monitor, and said decision is further based on said plurality of parameters; and
said decision minimizes said power consumption cost.

22. The electronic device of claim 21, wherein:
at least one of said plurality of parameters is monitored by said electronic device; and
at least one of said plurality of parameters is monitored by said one or more cloud computing resources.

23. The electronic device of claim 21, wherein said plurality of parameters includes at least one of the following:
for each individual executable component allocated to said electronic device, an execution power cost associated with said individual executable component;
a transportation power cost associated with communicating data between said electronic device and said one or more cloud computing resources; and
size of data communicated between at least one individual executable component allocated to said electronic device and at least one individual executable component allocated to said one or more cloud computing resources.

24. The electronic device of claim 23, wherein said transportation power cost is based on at least one of the following: signal strength between said electronic device and said one or more cloud computing resources, status of network traffic between said electronic device and said one or more cloud computing resources, and one or more network interfaces on said electronic device.

25. The electronic device of claim 19, wherein said decision comprises a decision to offload, during runtime of said one or more individual executable components, at least one of said one or more individual executable components to said one or more cloud computing resources.

26. The electronic device of claim 19, wherein said decision comprises a decision to onload, during runtime of said one or more individual executable components, at least one of said one or more individual executable components on said electronic device.

27. The electronic device of claim 19, wherein the cost model is for multiple electronic devices having at least one of similar cost preferences and similar device configuration data.

28. A non-transitory processor-readable medium having instructions which when executed on a computer perform a method comprising:
generating a customized cost model for an electronic device based on one or more cost preferences corresponding to said electronic device; and
based on said customized cost model, reducing a power consumption cost associated with execution of computer executable code on said electronic device by generating a decision relating to allocation of one or more individual executable components of said computer executable code between said electronic device and one or more cloud computing resources for execution.

29. The non-transitory processor-readable medium of claim 28, the method further comprising:
obtaining sensor information associated with said electronic device;
obtaining sensor information associated with said one or more cloud computing resources; and distinguishing sensor information associated with said electronic device from sensor information associated with said one or more cloud computing resources;

wherein said customized cost model is further based on sensor information associated with said electronic device and sensor information associated with said one or more cloud computing resources.

30. The non-transitory processor-readable medium of claim 28, the method further comprising:

monitoring a plurality of parameters identified by said customized cost model, and said decision is further based on said plurality of parameters;

wherein said decision minimizes said power consumption cost; and wherein said plurality of parameters includes at least one of the following:

for each individual executable component allocated to said electronic device, an execution power cost associated with said individual executable component;

a transportation power cost associated with communicating data between said electronic device and said one or more cloud computing resources; and size of data communicated between at least one individual executable component allocated to said electronic device and at least one individual executable component allocated to said one or more cloud computing resources.

* * * * *